United States Patent
Yoshida et al.

(10) Patent No.: US 10,193,241 B2
(45) Date of Patent: Jan. 29, 2019

(54) FIXING STRUCTURE AND FIXING METHOD

(71) Applicant: Japan Aviation Electronics Industry, Ltd., Tokyo (JP)

(72) Inventors: Takushi Yoshida, Tokyo (JP); Hiroshi Akimoto, Tokyo (JP); Yosuke Seki, Chiba (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 0 days.

(21) Appl. No.: 15/265,898

(22) Filed: Sep. 15, 2016

(65) Prior Publication Data
US 2017/0110805 A1    Apr. 20, 2017

(30) Foreign Application Priority Data

Oct. 20, 2015    (JP) .................................. 2015-206109

(51) Int. Cl.
| | |
|---|---|
| *B23K 26/38* | (2014.01) |
| *B23K 1/005* | (2006.01) |
| *H01R 4/02* | (2006.01) |
| *B23K 26/382* | (2014.01) |
| *H01R 43/02* | (2006.01) |
| *B23K 101/42* | (2006.01) |
| *B23K 103/12* | (2006.01) |

(52) U.S. Cl.
CPC ............ *H01R 4/024* (2013.01); *B23K 1/0056* (2013.01); *B23K 26/389* (2015.10); *H01R 43/0221* (2013.01); *B23K 2101/42* (2018.08); *B23K 2103/12* (2018.08)

(58) Field of Classification Search
CPC .... B23K 1/0056; B23K 26/389; H01R 4/024; H01R 43/0221
See application file for complete search history.

(56) References Cited

U.S. PATENT DOCUMENTS

| | | | |
|---|---|---|---|
| 6,909,180 B2 | 6/2005 | Ono et al. | |
| 2003/0056981 A1 | 3/2003 | Furukuwa | |
| 2003/0096541 A1* | 5/2003 | Onizuka | H01R 9/2458 439/876 |
| 2004/0020975 A1* | 2/2004 | Smith | B23K 1/0016 228/245 |
| 2006/0043543 A1 | 3/2006 | Wada et al. | |

(Continued)

FOREIGN PATENT DOCUMENTS

| | | |
|---|---|---|
| CN | 203951678 U | 11/2014 |
| JP | 06-045752 A * | 2/1994 |

(Continued)

OTHER PUBLICATIONS

Machine translation of Japan Patent document No. 06-045,752, Apr. 2018.*

(Continued)

*Primary Examiner* — Geoffrey S Evans
(74) *Attorney, Agent, or Firm* — Maier & Maier, PLLC

(57) ABSTRACT

A fixing method for fixing a terminal to a conductive pattern with a brazing filler metal disposed therebetween includes: a first step of disposing the brazing filler metal on the conductive pattern; a second step of bringing the terminal into contact with the brazing filler metal; and a third step of forming a penetrating hole in the terminal by irradiating a laser beam onto the terminal. In the third step, the laser beam is irradiated onto the terminal in such a manner that the penetrating hole is filled with the brazing filler metal melted by the irradiation of the laser beam.

9 Claims, 37 Drawing Sheets

(56) References Cited

U.S. PATENT DOCUMENTS

| | | | | |
|---|---|---|---|---|
| 2007/0193991 A1* | 8/2007 | Yamasaki | ............ | B23K 1/0056 |
| | | | | 219/121.85 |
| 2007/0199926 A1* | 8/2007 | Watanabe | .......... | H01R 43/0221 |
| | | | | 219/121.64 |
| 2008/0295323 A1* | 12/2008 | Tseng | ................... | H05K 1/0206 |
| | | | | 29/825 |
| 2012/0237787 A1* | 9/2012 | Yoshida | ............. | H01R 43/0221 |
| | | | | 428/615 |
| 2016/0226168 A1 | 8/2016 | Okura et al. | | |
| 2016/0372881 A1* | 12/2016 | Bauer | .................... | H01R 4/187 |

FOREIGN PATENT DOCUMENTS

| | | | |
|---|---|---|---|
| JP | 2003-204149 A | | 7/2003 |
| JP | 2007-265962 A | * | 10/2007 |
| TW | 200611615 A | | 4/2006 |
| TW | 201513760 A | | 4/2015 |
| TW | 201530923 A | | 8/2015 |

OTHER PUBLICATIONS

Taiwanese Office Action dated Mar. 23, 2017, in connection with corresponding TW Application No. 105132229 (15 pgs., including English translation).

U.S. Office Action dated Feb. 23, 2018, in connection with corresponding U.S. Appl. No. 15/821,886 (11 pgs.).

Chinese Office Action dated Sep. 13, 2018, in connection with counterpart CN Application No. 201610855675.3 (17 pages, including machine-generated English translation).

* cited by examiner

FIXING STRUCTURE AND FIXING METHOD

CROSS REFERENCE TO RELATED APPLICATIONS

This application is based upon and claims the benefit of priority from Japanese patent application No. 2015-206109, filed on Oct. 20, 2015, the disclosure of which is incorporated herein in its entirety by reference.

BACKGROUND OF THE INVENTION

1. Field of the Invention

The present invention relates to a fixing structure and a fixing method.

2. Description of Related Art

Japanese Unexamined Patent Application Publication No. 2003-204149 discloses a technique for soldering lead terminals 101 of an FPIC (Flat Package Integrated Circuit) 100 to a wiring electrode 103 of a printed board 102 as shown in FIG. 37 of the present application. Specifically, a laser beam 106 output from a laser oscillator 105 is irradiated onto each lead terminal 101, so that a solder layer 104 is melted and spread out and the lead terminal 101 is soldered to the wiring electrode 103.

In particular, in the fields of FPIC and connectors, when a laser beam is used to fix a terminal to a conductive pattern formed on a substrate, a reduction in laser beam irradiation time per terminal is directly linked to an improvement in productivity.

However, in the structure disclosed in Japanese Unexamined Patent Application Publication No. 2003-204149 described above, it has been difficult to further reduce the laser beam irradiation time per terminal. This is because in the structure disclosed in Japanese Unexamined Patent Application Publication No. 2003-204149, each lead terminal 101 is fixed to the wiring electrode 103 by wetting phenomena of the melted solder layer 104. In this case, it is necessary to continuously heat the lead terminals 101 by a laser beam until the lead terminals 101 become wet with the solder layer 104. A time required until the lead terminals 101 become wet with the solder layer 104 is called a zero cross time. The zero cross time is about several hundred msec.

Accordingly, an object of the present invention is to provide a technique for reducing a laser beam irradiation time per terminal when a terminal is fixed to an object to be fixed with a brazing filler metal.

SUMMARY OF THE INVENTION

A first exemplary aspect of the present invention is a fixing method for fixing a terminal to an object to be fixed with a brazing filler metal disposed therebetween, the fixing method including: a first step of disposing the brazing filler metal on the object to be fixed; a second step of bringing the terminal into contact with the brazing filler metal; and a third step of forming a penetrating hole in the terminal by irradiating a laser beam onto the terminal. In the third step, the laser beam is irradiated onto the terminal in such a manner that the penetrating hole is filled with the brazing filler metal melted by the irradiation of the laser beam.

A second exemplary aspect of the present invention is a fixing structure including: a substrate; a conductive pattern formed on the substrate; an adhesive layer formed of a brazing filler metal; and a terminal, the terminal being fixed to the conductive pattern by the adhesive layer. A penetrating hole is formed in the terminal, the penetrating hole being gradually widened in a direction apart from the substrate. The penetrating hole is filled with the brazing filler metal.

A third aspect of the present invention is a fixing structure including: a wire including a conductor; a brazing filler metal wetting the conductor; and a terminal, the terminal being fixed to the conductor by the brazing filler metal. A penetrating hole is formed in the terminal, the penetrating hole being gradually widened in a direction apart from a central axis of the conductor. The penetrating hole is filled with the brazing filler metal.

According to the above-mentioned aspects of the present invention, the brazing filler metal enters the penetrating hole, thereby allowing the terminal to be fixed to the conductive pattern with the brazing filler metal disposed therebetween. Further, the fixation between the terminal and the brazing filler metal is not due to wetting phenomena. Accordingly, the laser beam irradiation time per terminal can be reduced as compared with a case where the fixation between the terminal and the brazing filler metal is due to wetting phenomena. Furthermore, according to the above-mentioned aspects of the present invention, since the brazing filler metal reaches the vicinity of the upper end of the penetrating hole, whether the terminal and the brazing filler metal are fixed to each other can be confirmed when a laser beam irradiation surface of the terminal is viewed from above.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS (First Exemplary Embodiment)

A first exemplary embodiment will be described below with reference to FIGS. 1 to 4.

Figure 1:
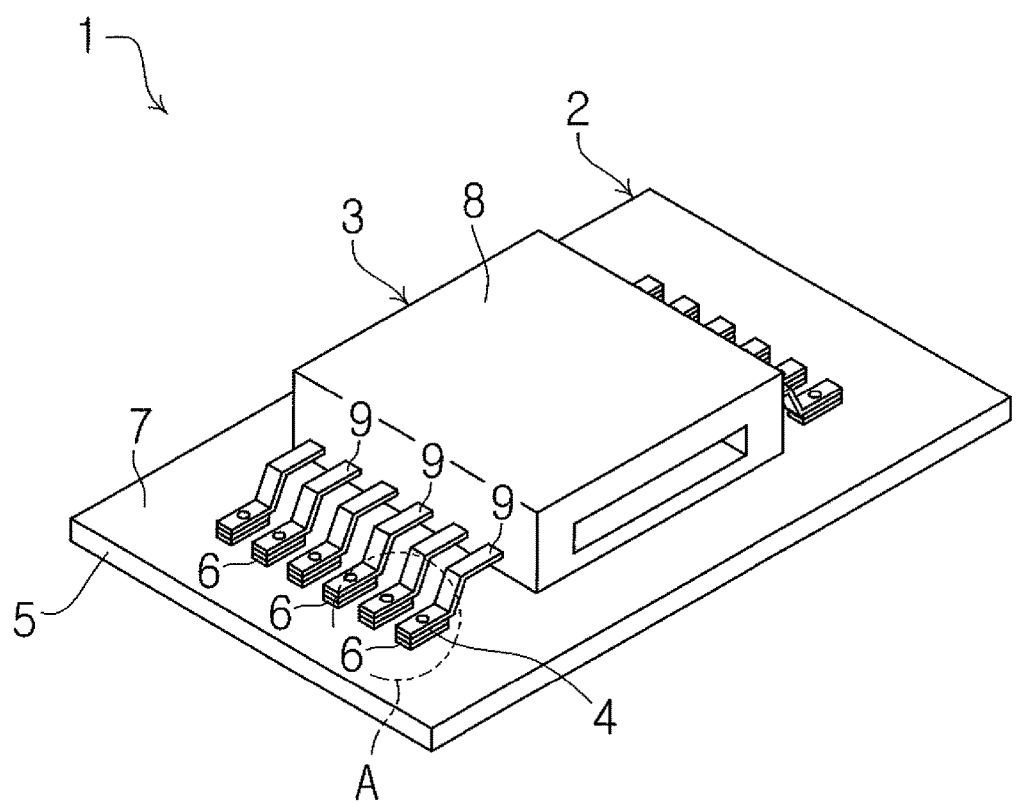
FIG. 1 is a perspective view of a circuit module (first exemplary embodiment)

FIG. 1 is a perspective view of a circuit module 1. The circuit module 1 includes a circuit board 2, a connector 3 (electronic component), and an adhesive layer 4.

The circuit board 2 includes an insulating substrate (substrate) 5 and a plurality of conductive patterns 6. The insulating substrate 5 is formed of, for example, a glass epoxy resin or paper phenol. The plurality of conductive patterns 6 are formed on a connector mounting surface 7 of the insulating substrate 5. Each of the plurality of conductive patterns 6 is formed of, for example, a copper foil or aluminum foil.

Figure 2:
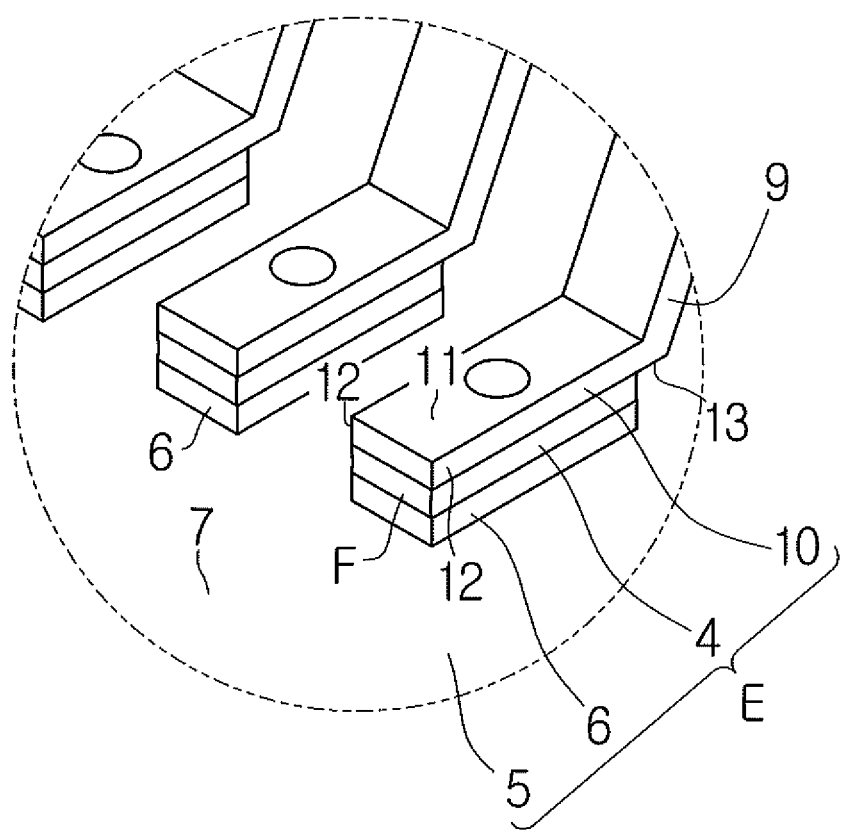
FIG. 2 is an enlarged view of a portion "A" shown in FIG. 1 (first exemplary embodiment)

The connector 3 includes a housing 8 and a plurality of terminals 9. The housing 8 is formed of an insulating resin. Each of the plurality of terminals 9 is formed of a Cu-based or Au-based metal. In the first exemplary embodiment, each of the plurality of terminals 9 is formed of a Cu-based metal and is plated with gold. FIG. 2 is an enlarged view of a portion "A" shown in FIG. 1. As shown in FIG. 2, each terminal 9 includes a fixed portion 10. The fixed portion 10 corresponds to a leading end portion of each terminal 9. The thickness direction of the fixed portion 10 is orthogonal to the connector mounting surface 7 of the insulating substrate 5. The fixed portion 10 is elongated in a direction parallel to the connector mounting surface 7 of the insulating substrate 5. The fixed portion 10 includes an upper surface 11 (laser beam irradiation surface), two side surfaces 12, and a lower surface 13. The fixed portion 10 of each terminal 9 is fixed to the corresponding conductive pattern 6 with the adhesive layer 4 disposed therebetween. The insulating substrate 5, the conductive pattern 6, the adhesive layer 4, and the fixed portion 10 constitute a fixing structure E.

The adhesive layer 4 is formed of a brazing filler metal F. In the first exemplary embodiment, the brazing filler metal F that forms the adhesive layer 4 is a solder.

Figure 3:
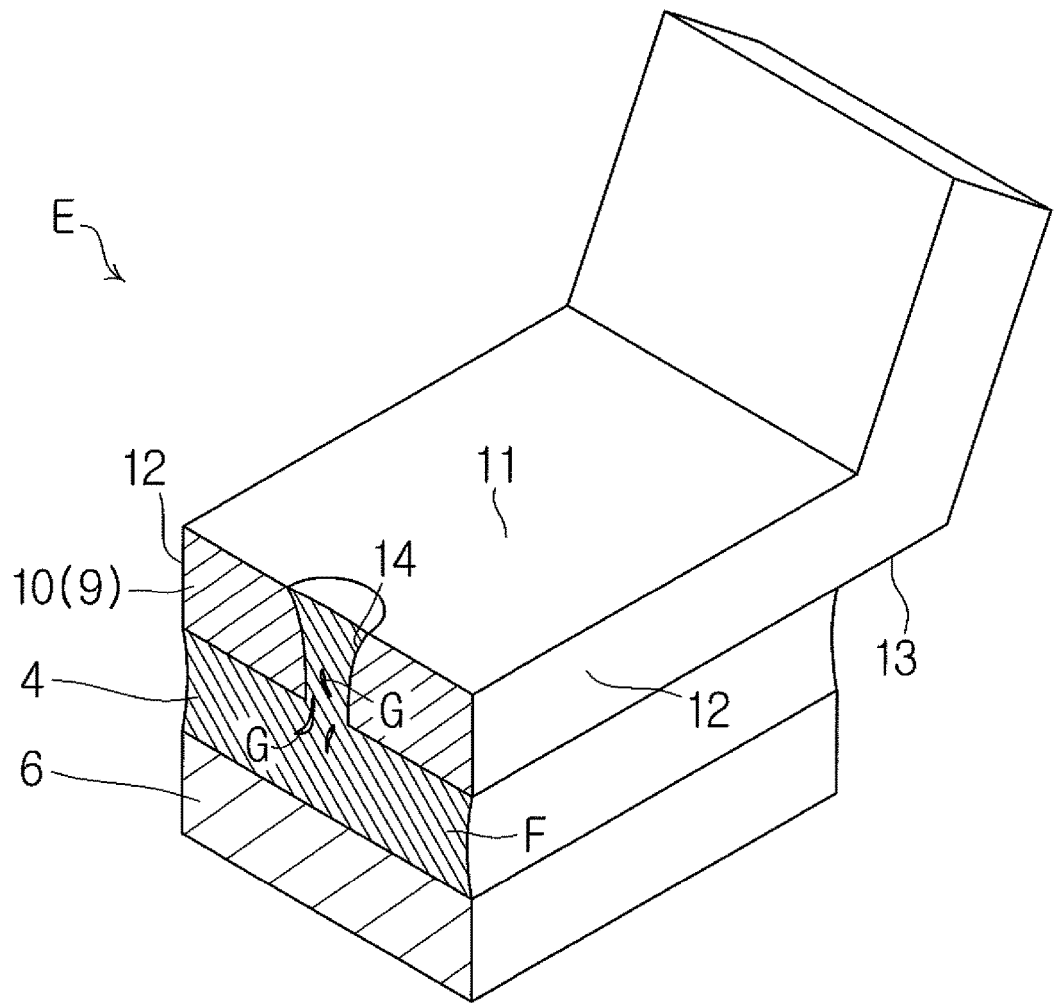
FIG. 3 is a partially cutaway perspective view of a fixing structure (first exemplary embodiment)
Figure 4:
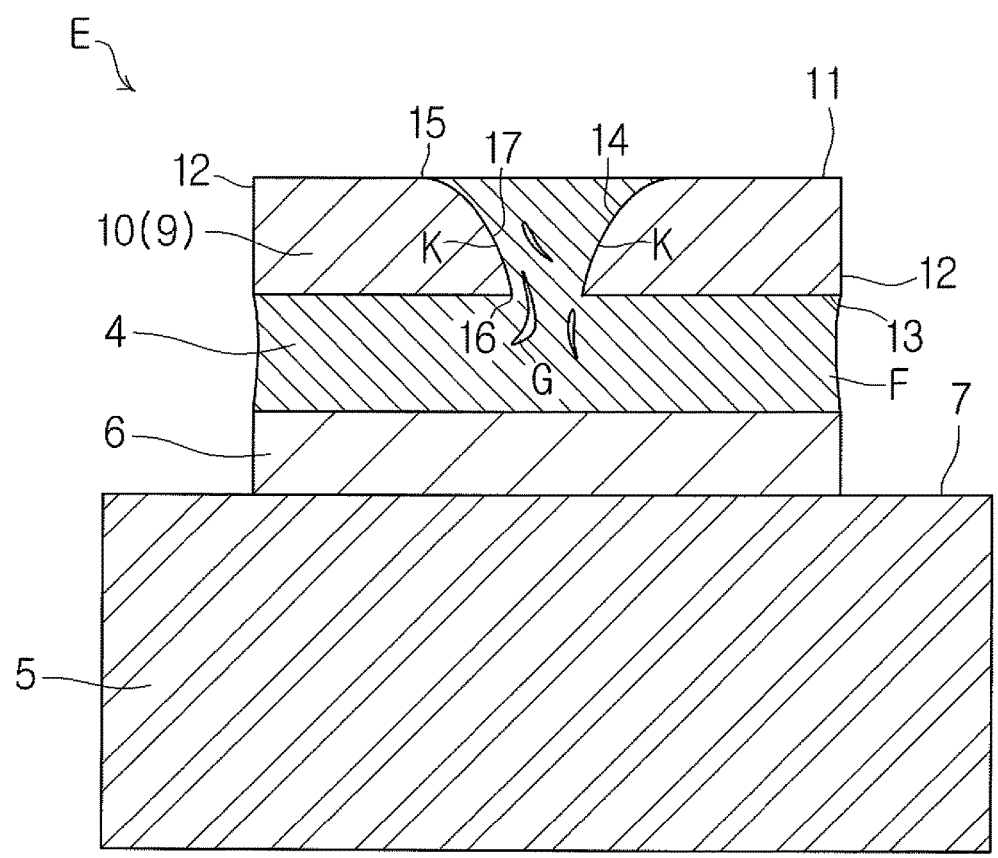
FIG. 4 is a sectional view of the fixing structure (first exemplary embodiment)

The fixing structure E will be described in detail below with reference to FIGS. 3 and 4. FIG. 3 is a partially cutaway perspective view of the fixing structure E. FIG. 4 is a sectional view of the fixing structure E.

Referring to FIGS. 3 and 4, the adhesive layer 4 and the conductive pattern 6 are fixed to each other by wetting phenomena. The adhesive layer 4 is melted and solidified, which allows the adhesive layer 4 and the conductive pattern 6 to be fixed to each other.

In contrast, the adhesive layer 4 and the fixed portion 10 are fixed to each other with the brazing filler metal F extending within the fixed portion 10 in such a manner that the brazing filler metal F gradually increases in width in a direction apart from the insulating substrate 5. In other words, the brazing filler metal F projects into the fixed portion 10 from the adhesive layer 4, and the brazing filler metal F present in the fixed portion 10 gradually increases in width in the direction apart from the insulating substrate 5. The brazing filler metal F present in the fixed portion 10 gradually widens in the direction apart from the insulating substrate 5.

Specifically, a penetrating hole 14 that penetrates the fixed portion 10 in a direction orthogonal to the connector mounting surface 7 is formed in the fixed portion 10. As shown in FIG. 4, the penetrating hole 14 includes an upper opening 15 and a lower opening 16. The upper opening 15 has a substantially circular shape and is opened at the upper surface 11, and the lower opening 16 has a substantially circular shape and is opened at the lower surface 13. The diameter of the upper opening 15 is larger than the diameter of the lower opening 16. In other words, the opening area of the upper opening 15 is larger than the opening area of the lower opening 16. Accordingly, the penetrating hole 14 gradually increases in width in the direction apart from the insulating substrate 5. The penetrating hole 14 gradually widens in the direction apart from the insulating substrate 5. An inner peripheral surface 17 of the penetrating hole 14 is curved to be convex inward. Specifically, in a section of the fixing structure E, two boundary lines K (boundaries) between the fixed portion 10 and the brazing filler metal F extending within the fixed portion 10 are curved to be convex inward. In a section of the fixing structure E, the two boundary lines K (boundaries) between the fixed portion 10 and the brazing filler metal F extending within the penetrating hole 14 of the fixed portion 10 are curved to be convex inward. The brazing filler metal F extends upward from the adhesive layer 4. The brazing filler metal F penetrates the penetrating hole 14 of the fixed portion 10 vertically. The brazing filler metal F is exposed at the upper surface 11 of the fixed portion 10. The brazing filler metal F is filled in the penetrating hole 14 of the fixed portion 10. The brazing filler metal F gradually increases in width in the direction apart from the insulating substrate 5. The brazing filler metal F extends within the penetrating hole 14, which is gradually narrowed in a direction approaching the insulating substrate 5, in such a manner that the brazing filler metal F gradually increases in width in the direction apart from the insulating substrate 5. With this structure, the fixed portion 10 and the adhesive layer 4 are fixed to each other.

In the vicinity of the lower surface 13 of the fixed portion 10, a metal G having the same metal component as the metal component of the terminal 9 is present slightly irregularly in the brazing filler metal F.

The first exemplary embodiment described above has the following features.

The fixing structure E includes the insulating substrate 5 (substrate), the conductive pattern 6 formed on the insulating substrate 5, the adhesive layer 4 formed of the brazing filler metal F, and the terminal 9. The terminal 9 is fixed to the conductive pattern 6 by the adhesive layer 4. The terminal 9 and the adhesive layer 4 are fixed to each other with the brazing filler metal F extending within the terminal 9 in such a manner that the brazing filler metal F gradually increases in width in the direction apart from the insulating substrate 5. In other words, the penetrating hole 14 is formed in the terminal 9, the penetrating hole 14 being gradually widened in a direction apart from the insulating substrate 5, and the penetrating hole 14 is filled with the brazing filler metal F. According to the above structure, the terminal 9 and the adhesive layer 4 are firmly fixed to each other.

The fixing structure E includes at least: one insulating substrate 5; one conductive pattern 6; one adhesive layer 4; and one terminal 9.

The brazing filler metal F penetrates the terminal 9 and reaches the vicinity of the upper surface 11 of the terminal 9. According to the above structure, whether the terminal 9 and the adhesive layer 4 are fixed to each other can be confirmed by visually recognizing the brazing filler metal F when the upper surface 11 of the terminal 9 is viewed from above.

As shown in FIG. 4, the boundary lines K between the terminal 9 and the brazing filler metal F extending within the terminal 9 are curved. In other words, the boundary lines K between the penetrating hole 14 and the brazing filler metal F are curved. According to the above structure, the contact area between the terminal 9 and the adhesive layer 4 is larger than that in a case where the boundary lines K are straight lines. Therefore, the terminal 9 and the adhesive layer 4 are more firmly fixed to each other.

As shown in FIG. 4, the boundary lines K between the terminal 9 and the brazing filler metal F extending within the terminal 9 are curved to be convex inward. In other words, the boundary lines K between the penetrating hole 14 and the brazing filler metal F is curved to be convex inward. According to the above structure, the volume of the internal space of the penetrating hole 14 can be reduced as compared with a case where the boundary lines K are curved to be convex outward. Therefore, the usage of the brazing filler metal F can be reduced.

Note that each boundary line K may look like a solid line, a dashed line, a dotted line, a dashed-dotted line, or an alternate long and two short dashes line.

While in the exemplary embodiment described above, the penetrating hole 14 that penetrates the fixed portion 10 in the direction orthogonal to the connector mounting surface 7 is formed in the fixed portion 10, the penetrating hole 14 may be formed in such a manner that the penetrating hole 14 penetrates the fixed portion 10 in a direction oblique to the connector mounting surface 7.

(Second Exemplary Embodiment)

Next, a second exemplary embodiment will be described with reference to FIGS. 5 and 6. Differences between the first exemplary embodiment and the second embodiment will be mainly described, while a repeat of previous descriptions is omitted.

As shown in FIG. 3, in the first exemplary embodiment described above, the brazing filler metal F penetrates the terminal 9 and reaches the vicinity of the upper surface 11 of the fixed portion 10.

Figure 5:
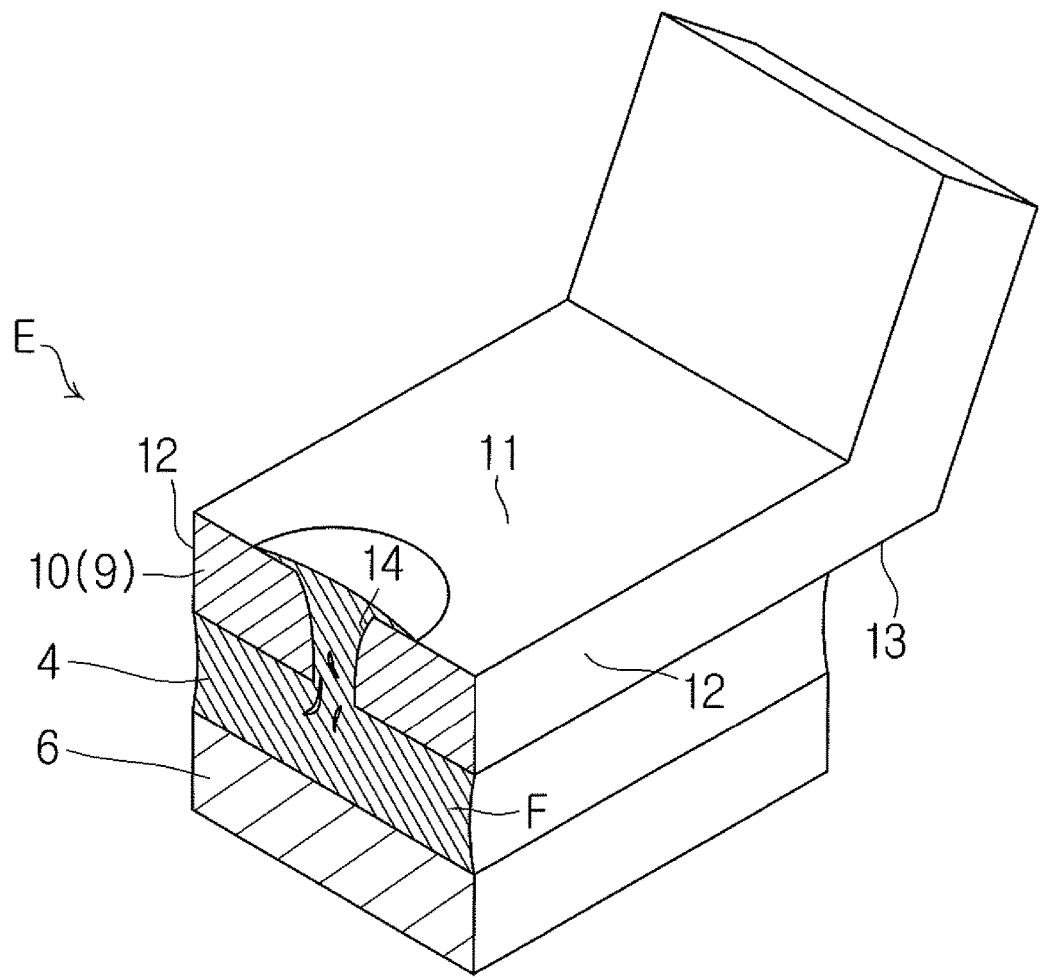
FIG. 5 is a partially cutaway perspective view of a fixing structure (second exemplary embodiment)
Figure 6:
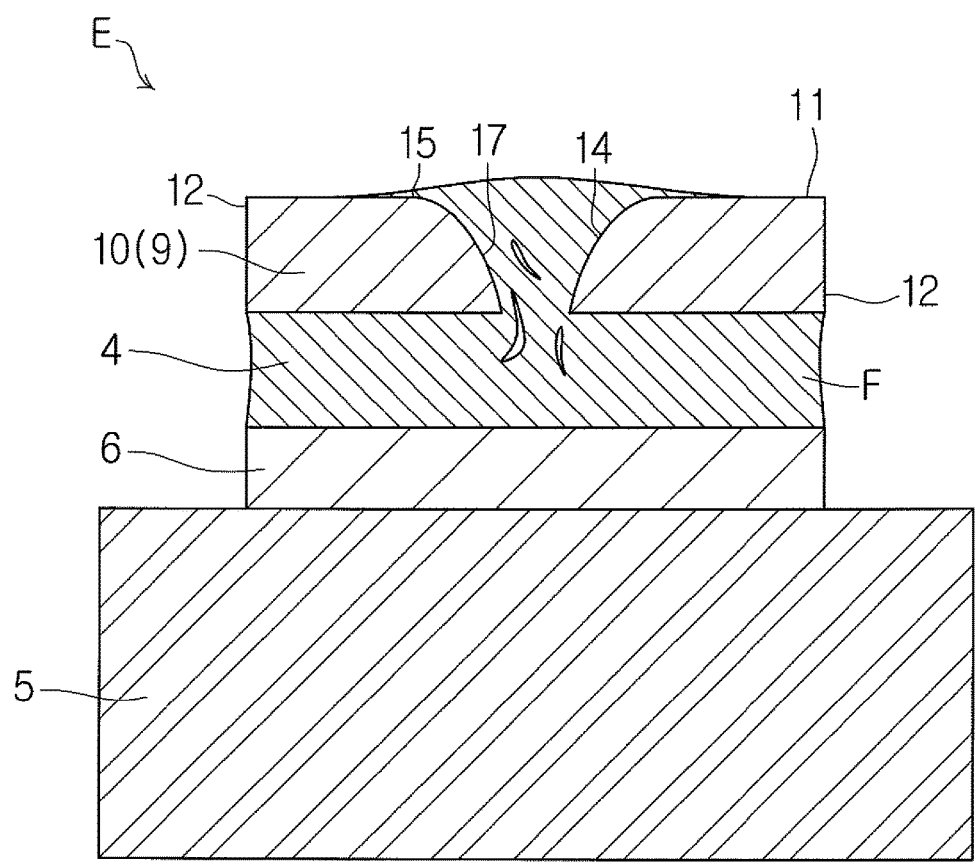
FIG. 6 is a sectional view of the fixing structure (second exemplary embodiment)

In contrast, in the second exemplary embodiment, as shown in FIGS. 5 and 6, the brazing filler metal F penetrates the terminal 9 and spreads over the upper surface 11 of the fixed portion 10 in a substantially circular shape. Specifically, as shown in FIG. 6, the brazing filler metal F spreads in a substantially circular shape to the outside of the upper opening 15 of the penetrating hole 14. The brazing filler metal F is deposited on the upper surface 11 of the fixed portion 10 at the outside of the upper opening 15 of the penetrating hole 14.

According to the above structure, the state in which the terminal 9 and the adhesive layer 4 are fixed to each other can be confirmed by visually recognizing the brazing filler metal F when the upper surface 11 of the terminal 9 is viewed from above. Further, since the area of the brazing filler metal F when the upper surface 11 of the terminal 9 is viewed from above is larger than that of the first exemplary embodiment described above, the brazing filler metal F can be easily recognized visually when the upper surface 11 of the terminal 9 is viewed from above. Furthermore, since the brazing filler metal F spreads over the upper surface 11 of the fixed portion 10, the fixed portion 10 and the adhesive layer 4 are more firmly fixed to each other as compared with the case of the first exemplary embodiment in which the brazing filler metal F does not spread over the upper surface 11 of the fixed portion 10.

(Third Exemplary Embodiment)

Next, a third exemplary embodiment will be described with reference to FIGS. 7 and 8. Differences between the first exemplary embodiment and the third embodiment will be mainly described, while a repeat of previous descriptions is omitted.

As shown in FIG. 3, in the first exemplary embodiment described above, the brazing filler metal F penetrates the terminal 9 and reaches the vicinity of the upper surface 11 of the fixed portion 10.

Figure 7:
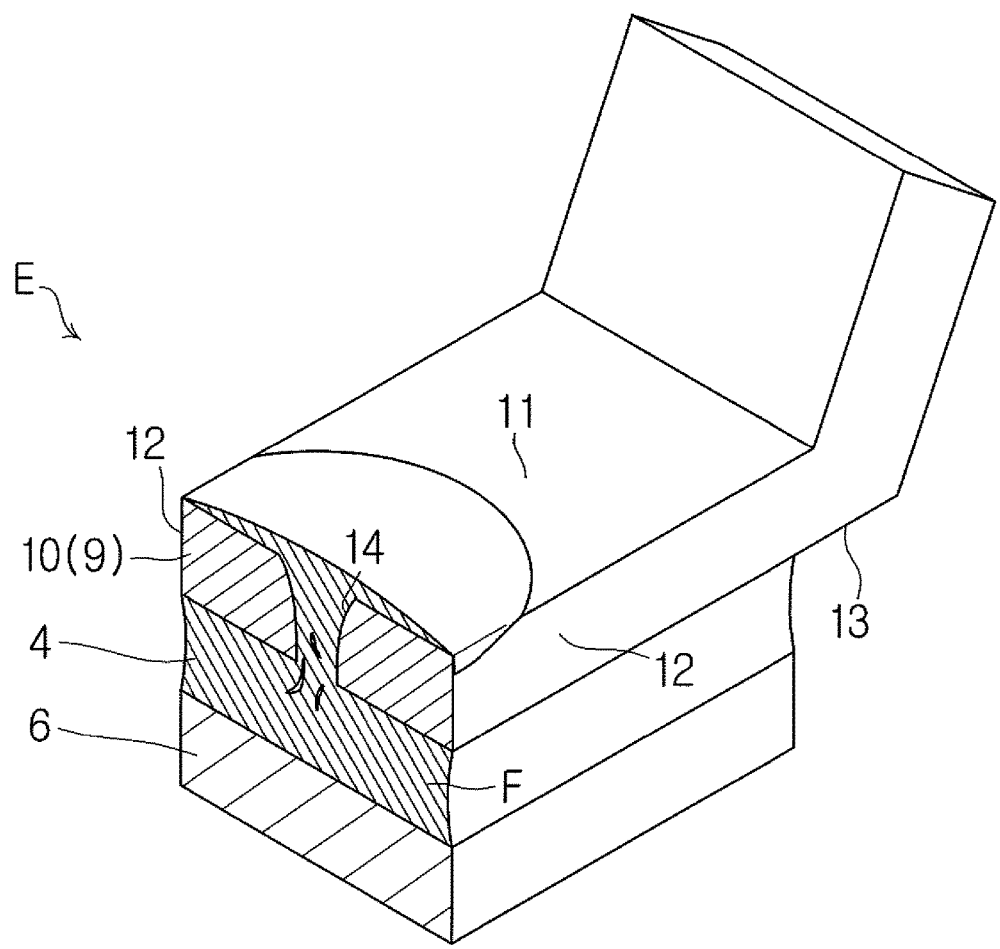
FIG. 7 is a partially cutaway perspective view of a fixing structure (third exemplary embodiment)
Figure 8:
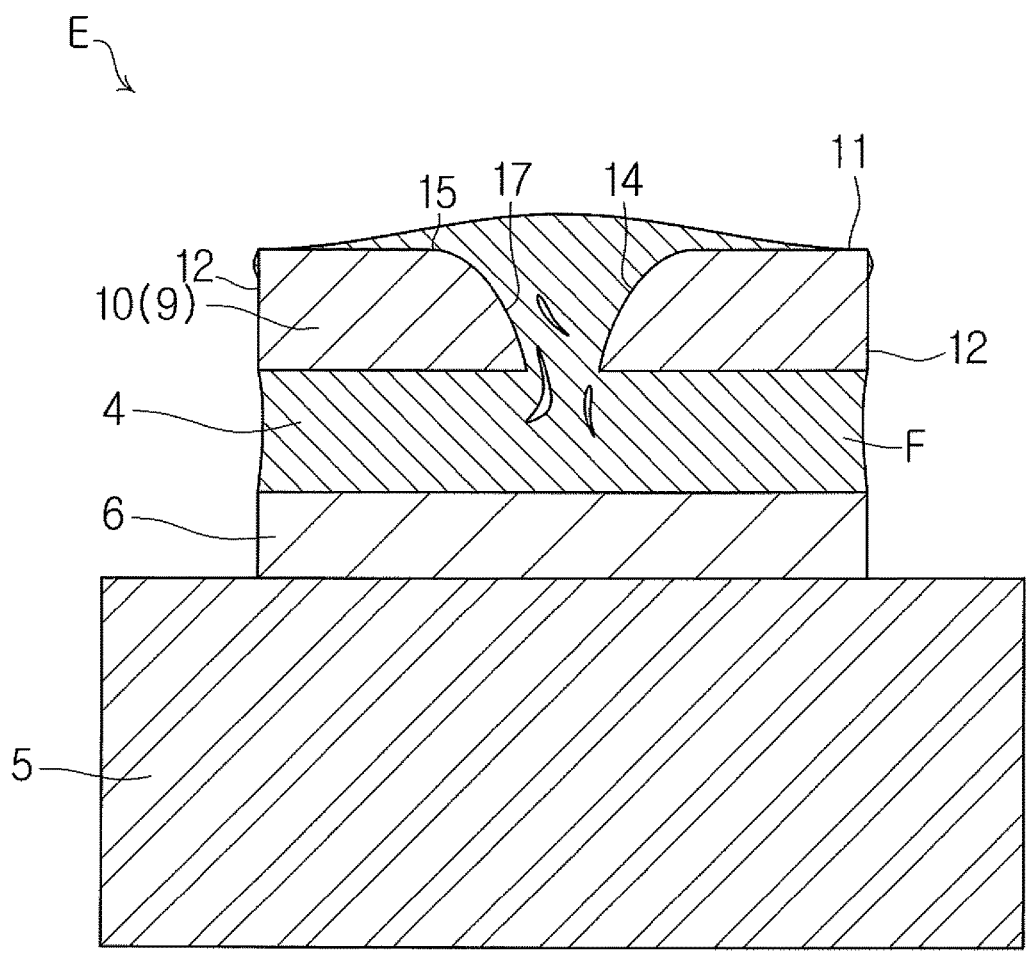
FIG. 8 is a sectional view of the fixing structure (third exemplary embodiment)

In contrast, in the third exemplary embodiment, as shown in FIGS. 7 and 8, the brazing filler metal F penetrates the terminal 9 and spreads over the upper surface 11 of the fixed portion 10 in a substantially circular shape. Specifically, as shown in FIG. 8, the brazing filler metal F spreads in a substantially circular shape to the outside of the upper opening 15 of the penetrating hole 14, and reaches the two side surfaces 12. The brazing filler metal F is deposited on the upper surface 11 and the two side surfaces 12 of the fixed portion 10 at the outside of the upper opening 15 of the penetrating hole 14.

According to the above structure, the state in which the terminal 9 and the adhesive layer 4 are fixed to each other can be confirmed by visually recognizing the brazing filler metal F when the upper surface 11 of the terminal 9 is viewed from above. Further, since the area of the brazing filler metal F when the upper surface 11 of the terminal 9 is viewed from above is larger than that of the first exemplary embodiment described above, the brazing filler metal F can be easily recognized visually when the upper surface 11 of the terminal 9 is viewed from above. Furthermore, since the brazing filler metal F spreads over the upper surface 11 of the fixed portion 10, the fixed portion 10 and the adhesive layer 4 are more firmly fixed to each other as compared with the case of the first exemplary embodiment in which the brazing filler metal F does not spread over the upper surface 11 of the fixed portion 10.

(Fixing Method)

Figure 9:
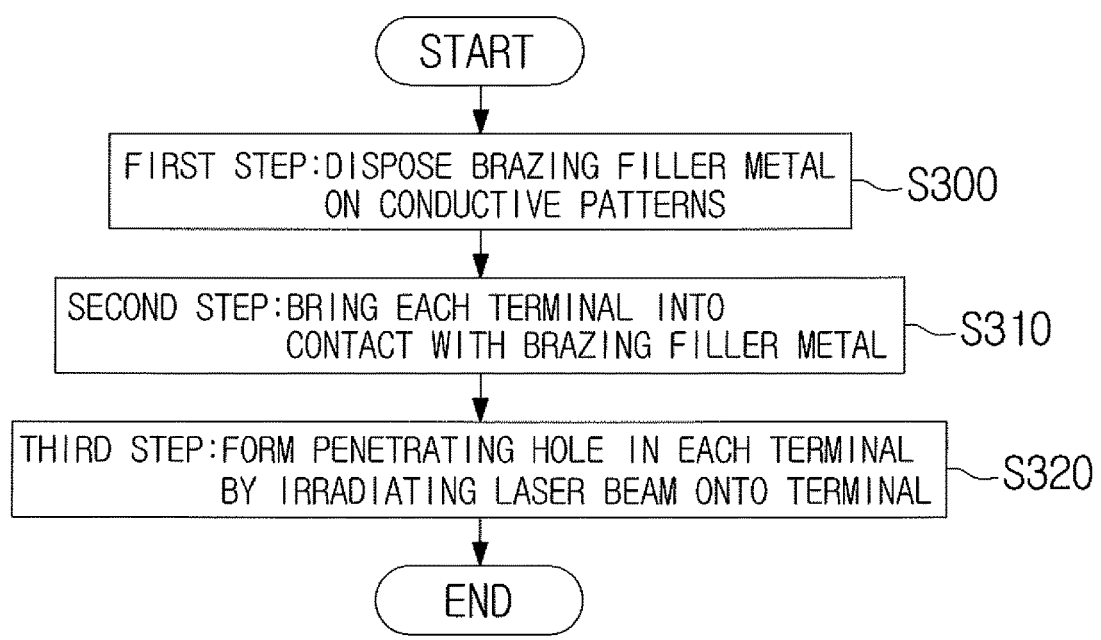
FIG. 9 is a flowchart showing a fixing method.

Referring to FIGS. 9 to 16, a fixing method for fixing each terminal 9 to the corresponding conductive pattern 6 via the brazing filler metal F will be described below. FIG. 9 is a flowchart showing the fixing method. FIGS. 10 to 16 are views showing the state of each process of the fixing method.

As shown in FIG. 9, the fixing method includes a first step (S300), a second step (S310), and a third step (S320) in this order. The first step (S300), the second step (S310), and the third step (S320) will be described below in this order.

(First Step: S300)

In the first step, the brazing filler metal F is disposed on the conductive pattern 6 as described in detail below.

Figure 10:
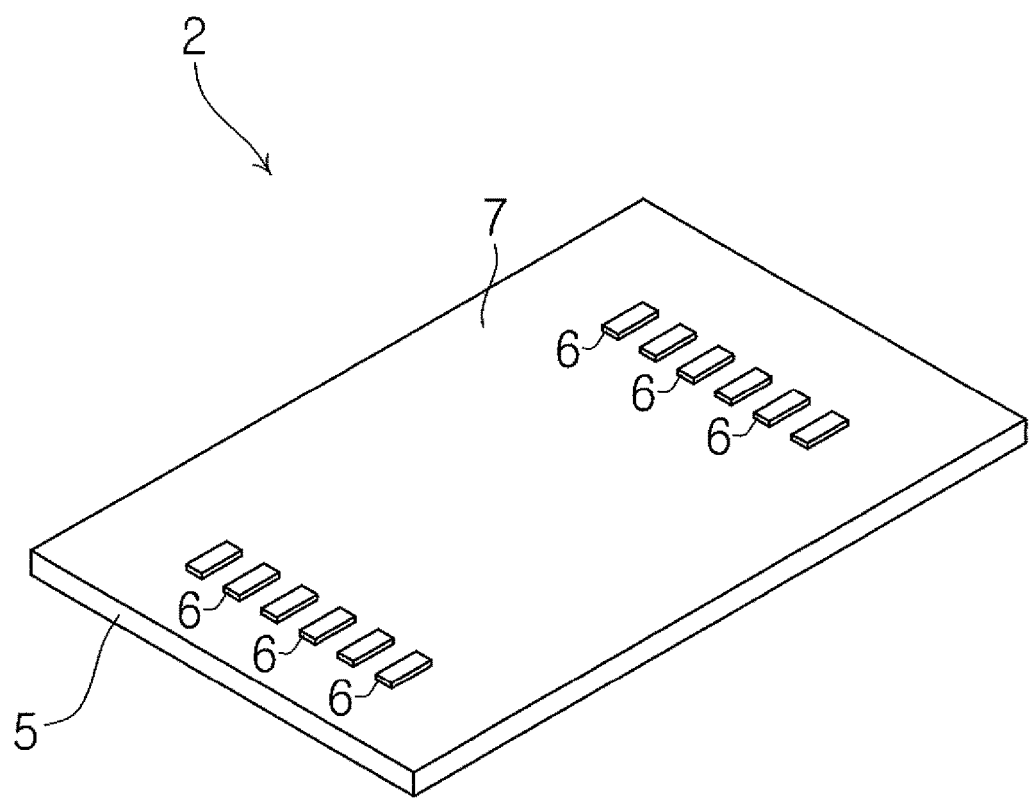
FIG. 10 is a perspective view of a circuit board.
Figure 11:
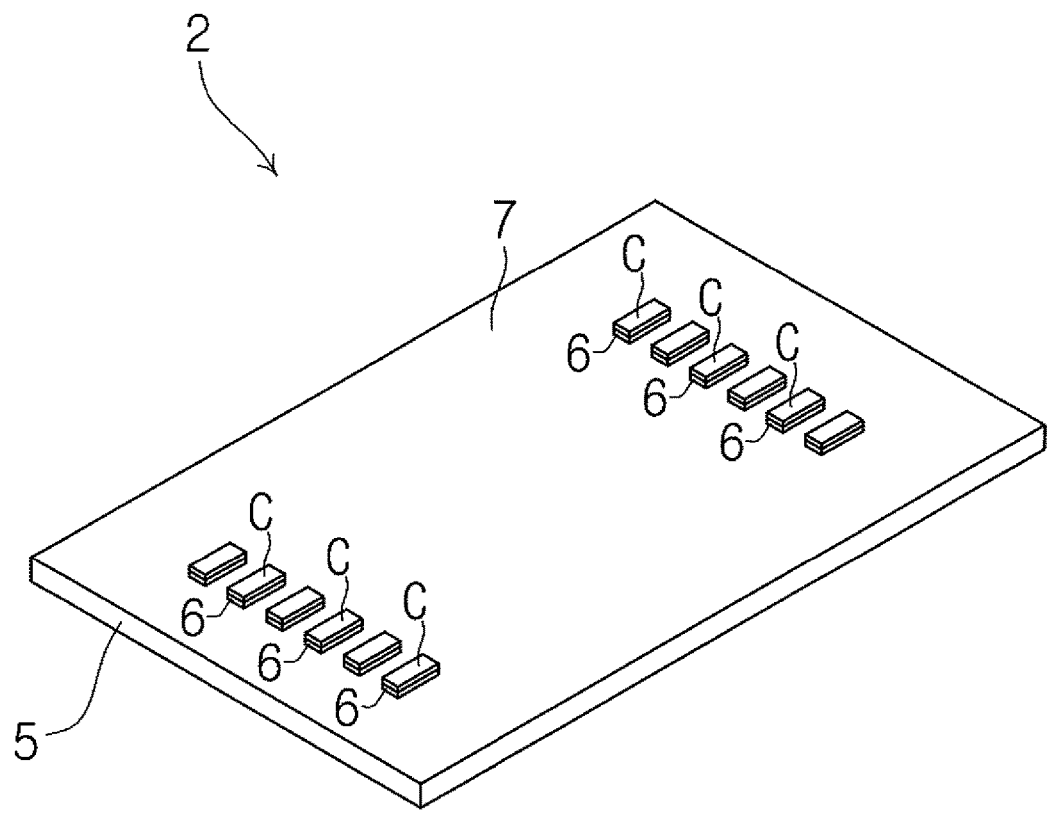
FIG. 11 is a perspective view showing a state in which each conductive pattern is coated with cream solder.
Figure 12:
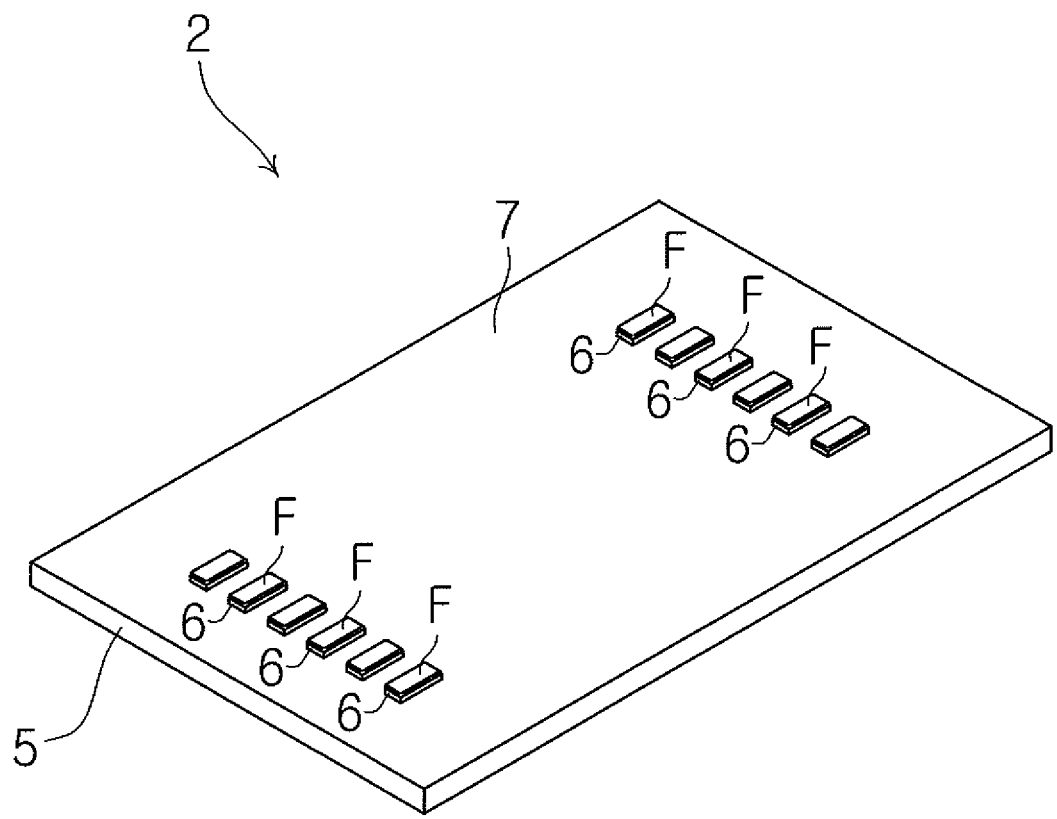
FIG. 12 is a perspective view showing a state of the circuit board after a reflow process is performed on the circuit board in a reflow furnace.

As shown in FIG. 10, the plurality of conductive patterns 6 are formed on the connector mounting surface 7 of the insulating substrate 5. As shown in FIG. 11, a cream solder printer (not shown) coats each conductive pattern 6 with a cream solder C. Next, the circuit board 2 is placed in a reflow furnace (not shown) and a reflow process is carried out. As a result, as shown in FIG. 12, the brazing filler metal F which is solidified and slightly rounded by surface tension is formed on the corresponding conductive pattern 6. At this time, the brazing filler metal F wets the corresponding conductive pattern 6.

(Second Step: S310)

In the second step, each terminal 9 is brought into contact with the brazing filler metal F as described in detail below.

Figure 13:
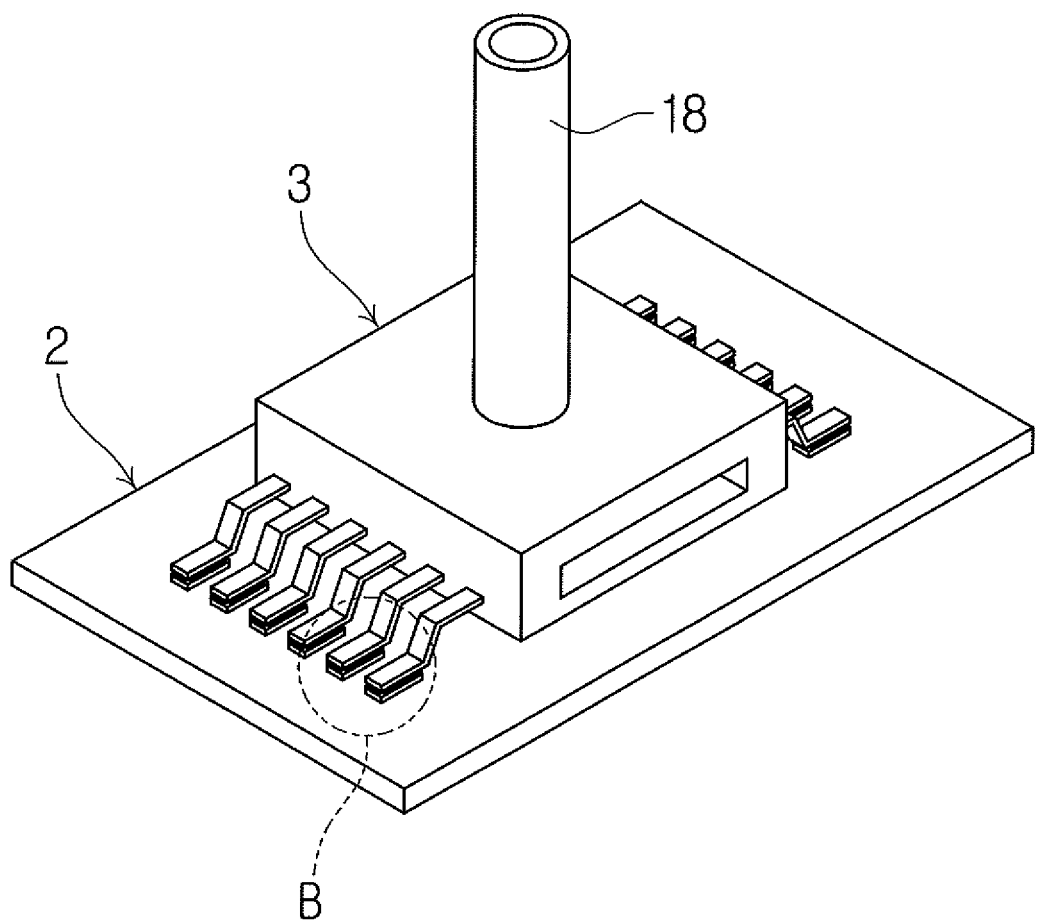
FIG. 13 is a perspective view showing a state in which a connector is disposed on the circuit board.
Figure 14:
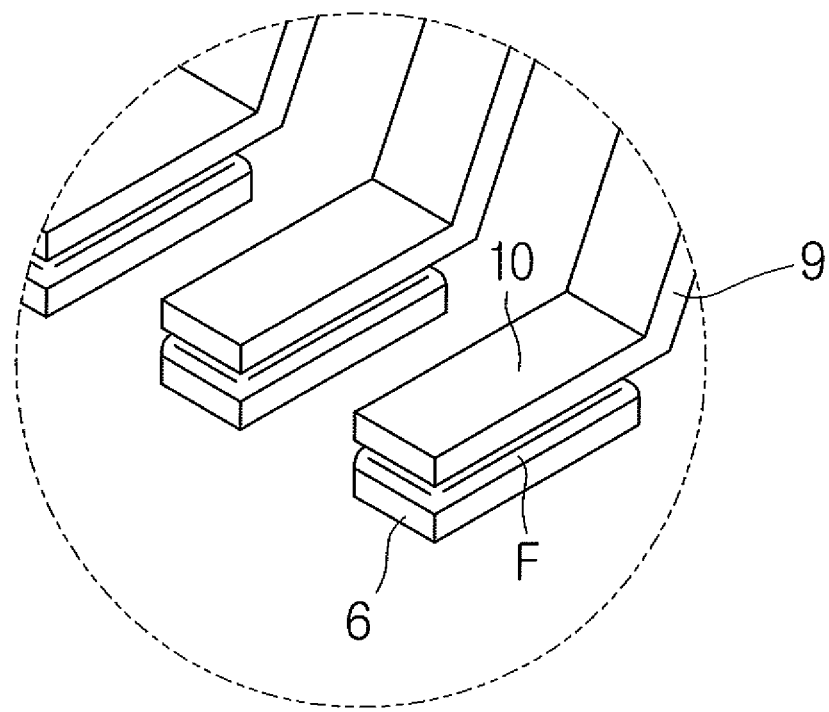
FIG. 14 is an enlarged view of a portion "B" shown in FIG. 13.

As shown in FIG. 13, a surface mounter (not shown) sucks and holds the connector 3 by using a suction nozzle 18, and disposes the connector 3 at a desired position on the circuit board 2. Specifically, as shown in FIG. 14, the surface mounter disposes the connector 3 on the circuit board 2 in such a manner that the fixed portion 10 of each terminal 9 is opposed to the brazing filler metal F in the vertical direction and is brought into contact with the brazing filler metal F. At this time, the surface mounter disposes the connector 3 on the circuit board 2 in such a manner that the fixed portion 10 of each terminal 9 is pressed against the brazing filler metal F. When the fixed portion 10 of each terminal 9 is pressed against the brazing filler metal F, each terminal 9 is slightly bent and deformed in the vertical direction.

(Third Step: S320)

In the third step, a laser beam L is irradiated onto the fixed portion 10 of each terminal 9, thereby forming the penetrating hole 14 in the fixed portion 10 of each terminal 9 as described in detail below.

Figure 15:
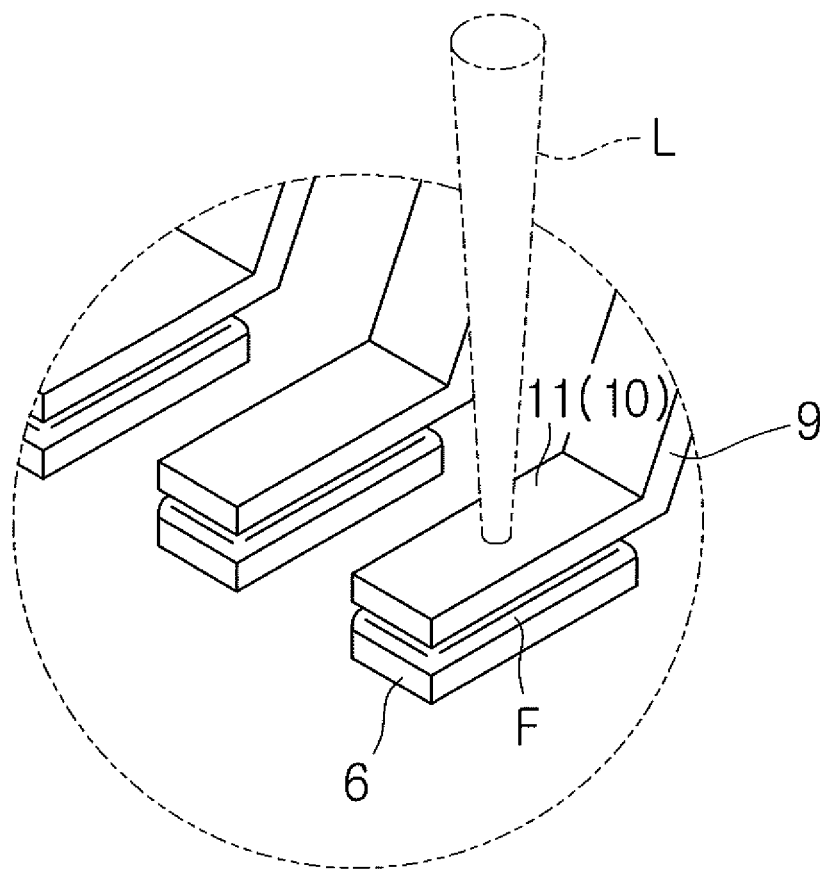
FIG. 15 is a perspective view showing a state in which a laser beam is irradiated onto an upper surface of a fixed portion of each terminal.

As shown in FIG. 15, a laser oscillator (not shown) irradiates the laser beam L onto the upper surface 11 (laser beam irradiation surface) of the fixed portion 10 of each terminal 9. The wavelength of the laser beam L irradiated onto the upper surface 11 of the fixed portion 10 of each terminal 9 is preferably, for example, 600 nm or less. The laser beam L having a wavelength of 600 nm or less has a high absorptance with respect to a Cu-based or Au-based metal, which enables each terminal 9 to be melted in a short period of time. Examples of the laser beam L having a wavelength of 600 nm or less include the second harmonic of YAG laser. The wavelength of the second harmonic of YAG laser is 532 nm. The third harmonic or the fourth harmonic of YAG laser may be used instead of the second harmonic of YAG laser. Other lasers such as a $CO_2$ laser or an excimer laser may be used instead of the YAG laser. The irradiation position of the laser beam L is within the region in which the fixed portion 10 of each terminal 9, the brazing filler metal F, and the conductive pattern 6 overlap each other in the irradiation direction of the laser beam L.

Figure 16:
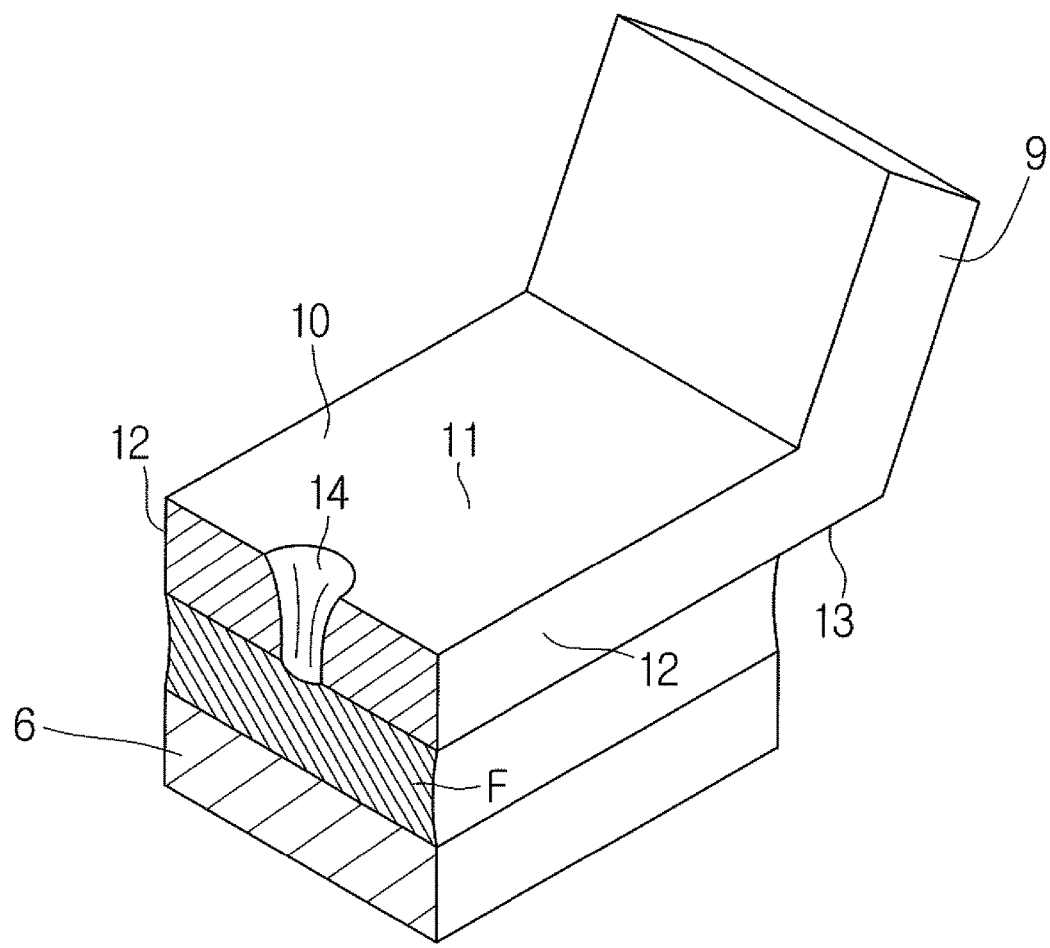
FIG. 16 is a perspective view showing a state in which a penetrating hole is formed in each terminal.

When the laser beam L is irradiated onto the upper surface 11 of the fixed portion 10 of each terminal 9, the fixed portion 10 of each terminal 9 is locally vaporized, and as shown in FIG. 16, the penetrating hole 14 (key hole) extending vertically is formed in the fixed portion 10 of each terminal 9. The penetrating hole 14 is formed in such a manner that the penetrating hole 14 is gradually narrowed toward the corresponding conductive pattern 6.

After the irradiation of the laser beam L is finished, the melted brazing filler metal F enters the penetrating hole 14 and the brazing filler metal F is solidified within the penetrating hole 14 as shown in FIGS. 3 to 8. As a result, the fixed portion 10 of each terminal 9 and the brazing filler metal F are fixed to each other. Irradiation conditions, such as the wavelength of the laser beam L and an irradiation time, may be set so that the brazing filler metal F melted by the irradiation of the laser beam L enters the penetrating hole 14 and reaches the vicinity of the upper opening 15 (upper end) of the penetrating hole 14 as shown in FIGS. 3 to 8.

Various principles can be applied as the principle that the melted brazing filler metal F enters the penetrating hole 14, but the present inventors consider as follows.

That is, first, when the laser beam L is irradiated onto the fixed portion 10 of each terminal 9, the fixed portion 10 of each terminal 9 is locally vaporized and the penetrating hole 14 is formed, and at the same time, the entire brazing filler metal F is melted once. When the laser beam L is irradiated onto the fixed portion 10 of each terminal 9, the fixed portion 10 of each terminal 9 is pressed against the brazing filler metal F, so that an external force to compress the brazing filler metal F acts on the melted brazing filler metal F. Due to the external force, the melted brazing filler metal F enters the penetrating hole 14 in such a manner that the brazing filler metal F is pressed out to the penetrating hole 14 and is pressed into the penetrating hole 14. The state in which the fixed portion 10 of each terminal 9 is pressed against the brazing filler metal F includes at least one of a state in which the fixed portion 10 of each terminal 9 is pressed against the brazing filler metal F actively by the surface mounter or by the spring restoring force of each terminal 9, and a state in which the fixed portion 10 of each terminal 9 is pressed against the brazing filler metal F by the weight of the connector 3.

The brazing filler metal F disposed on each conductive pattern 6 in the first step (S300) is not formed with a thickness of about 0.1 to several micrometers, which are implemented in a plating process, but is formed with a thickness of about several tens of micrometers to several hundreds of micrometers, which are implemented in, for example, the reflow process. It is estimated that the formation of the brazing filler metal F with such a thickness allows the brazing filler metal F to be melted and flow into the penetrating hole 14 of each terminal 9 before the heat generated in each terminal 9 by the irradiation of the laser beam L onto each terminal 9 defuses to the conductive pattern 6 and the insulating substrate 5.

Second, the melted brazing filler metal F is sucked into the penetrating hole 14 which is formed due to the irradiation of the laser beam L.

The fixing method described above has the following features.

The fixing method for fixing each terminal 9 to the corresponding conductive pattern 6 (object to be fixed) with the brazing filler metal F disposed therebetween includes: the first step (S300) of disposing the brazing filler metal F on the conductive pattern 6; the second step (S310) of bringing the terminal 9 into contact with the brazing filler metal F; and the third step (S320) of forming the penetrating hole 14 in the terminal 9 by irradiating the laser beam L onto the terminal 9. In the third step (S320), the laser beam L is irradiated onto the terminal 9 in such a manner that the brazing filler metal F melted by the irradiation of the laser beam L enters the penetrating hole 14 and reaches the vicinity of the upper opening 15 (upper end) of the penetrating hole 14. In other words, in the third step (S320), the laser beam L is irradiated onto the terminal 9 in such a manner that the penetrating hole 14 is filled with the brazing filler metal F melted by the irradiation of the laser beam L. According to the above method, the brazing filler metal F enters the penetrating hole 14, which allows the terminal 9 to be fixed to the conductive pattern 6 with the brazing filler metal F disposed therebetween. The present inventors consider that the fixation between the terminal 9 and the brazing filler metal F is not due to wetting phenomena. Accordingly, the irradiation time of the laser beam L per terminal can be reduced in comparison with the case where the fixation between the terminal 9 and the brazing filler metal F is due to wetting phenomena. According to the above method, since the brazing filler metal F reaches the vicinity of the upper opening 15 (upper end) of the penetrating hole 14, whether the terminal 9 and the brazing filler metal F are fixed to each other can be confirmed when the upper surface 11 (laser beam irradiation surface) of the terminal 9 is viewed from above.

In the third step (S320), the laser beam L may be irradiated onto the terminal 9 in such a manner that the brazing filler metal F melted by the irradiation of the laser beam L enters the penetrating hole 14, flows out of the upper opening 15 (upper end) of the penetrating hole 14, and spreads over the upper surface 11 (laser beam irradiation surface) of the terminal 9. In other words, in the third step (S320), the laser beam L may be irradiated onto the terminal 9 in such a manner that the brazing filler metal F melted by the irradiation of the laser beam L flows out of the upper opening 15 (upper end) of the penetrating hole 14, and spreads over the upper surface 11 (laser beam irradiation surface) of the terminal 9. According to the above method, it is possible to more easily confirm whether the terminal 9 and the brazing filler metal F are fixed to each other when the upper surface 11 (laser beam irradiation surface) of the terminal 9 is viewed from above. Further, since the brazing filler metal F spreads over the upper surface 11 of the fixed portion 10, the fixed portion 10 and the brazing filler metal F are more firmly fixed to each other as compared with a case where the brazing filler metal F does not spread over the upper surface 11 of the fixed portion 10.

In the third step (S320), the laser beam L is irradiated onto the terminal 9 while the terminal 9 is pressed against the brazing filler metal F. According to the above method, in the third step (S320), the brazing filler metal F enters the penetrating hole 14 more easily than in a case where the laser beam L is irradiated onto the terminal 9 without pressing the terminal 9 against the brazing filler metal F.

In this exemplary embodiment, the brazing filler metal F is a solder. In the first step (S300), the reflow process is carried out after the conductive pattern 6 is coated with the cream solder C, thereby disposing the brazing filler metal F on the conductive pattern 6. That is, the reflow process is carried out once to mount other components on the circuit board 2. Thus, the manufacturing process of the circuit module 1 can be simplified by using the reflow process when the brazing filler metal F is disposed on the conductive pattern 6.

The terminal 9 is a Cu-based or Au-based metal. The brazing filler metal F is a solder. According to the above method, since the color of the terminal 9 is significantly different from the color of the brazing filler metal F, the terminal 9 and the brazing filler metal F can be easily distinguished from each other and recognized when the upper surface 11 (laser beam irradiation surface) of the terminal 9 is viewed from above.

In the above exemplary embodiments, the brazing filler metal F is a solder and the solder is a soft solder. Alternatively, a hard solder such as a silver solder, a gold solder, a copper solder, or a brass solder may be used as the brazing filler metal F.

EXAMPLES

Examples will be described below.

The circuit module 1 was produced under the following conditions.

Insulating substrate 5: made of a glass epoxy resin

Conductive pattern 6: a copper foil (with a thickness of 18 micrometers)

Brazing filler metal F: an SnAgCu-based or SnZnBi-based lead-free solder (with a thickness of 100 micrometers)

Terminal 9: a Cu-based metal (with a thickness of 80 micrometers) plated with gold Laser beam L: the second harmonic of YAG laser (wavelength: 532 nm)

Energy density of laser beam irradiation: 19.1 J/mm$^2$

During laser beam irradiation, the fixed portion 10 of each terminal 9 is pressed against the brazing filler metal F to such an extent that each terminal 9 is slightly bent and deformed.

When the circuit module 1 was produced under the conditions described above, the fixing structure E as shown in FIGS. 3, 5, and 7 was formed.

The exemplary embodiments described above can be modified as follows.

In the exemplary embodiments described above, the connector 3 is mounted on the circuit board 2, but instead an FPIC (Flat Package Integrated Circuit) may be mounted on the circuit board 2. In this case, the housing 8 of the connector 3 corresponds to the package of the FPIC, and the plurality of terminals 9 of the connector 3 correspond to a plurality of lead frames included in the FPIC.

In the third step (S320), the laser beam L is irradiated onto the fixed portion 10 of each terminal 9 while the surface mounter presses the fixed portion 10 of each terminal 9 against the brazing filler metal F. However, means for pressing the fixed portion 10 of each terminal 9 against the brazing filler metal F is not limited to this. For example, a structure can be adopted in which the connector 3 includes: a first terminal that contacts a first surface of the circuit board 2; and a second terminal that contacts a second surface opposite to the first surface of the circuit board 2, and the first terminal and the second terminal resiliently sandwich the circuit board 2 by the elastic restoring force of the first terminal and the second terminal When the laser beam L is irradiated onto the fixed portion 10 of each terminal 9, the thickness direction of the fixed portion 10 of each terminal 9 is not necessarily orthogonal to the connector mounting surface 7 of the insulating substrate 5 of the circuit board 2, but instead the fixed portion 10 of each terminal 9 may be slightly inclined with respect to the circuit board 2. The laser beam L may be irradiated onto the fixed portion 10 of each terminal 9 while the fixed portion 10 of each terminal 9 is simply opposed to the brazing filler metal F.

(Fourth Exemplary Embodiment)

A fourth exemplary embodiment will be described below with reference to FIGS. 17 to 23.

Figure 17:
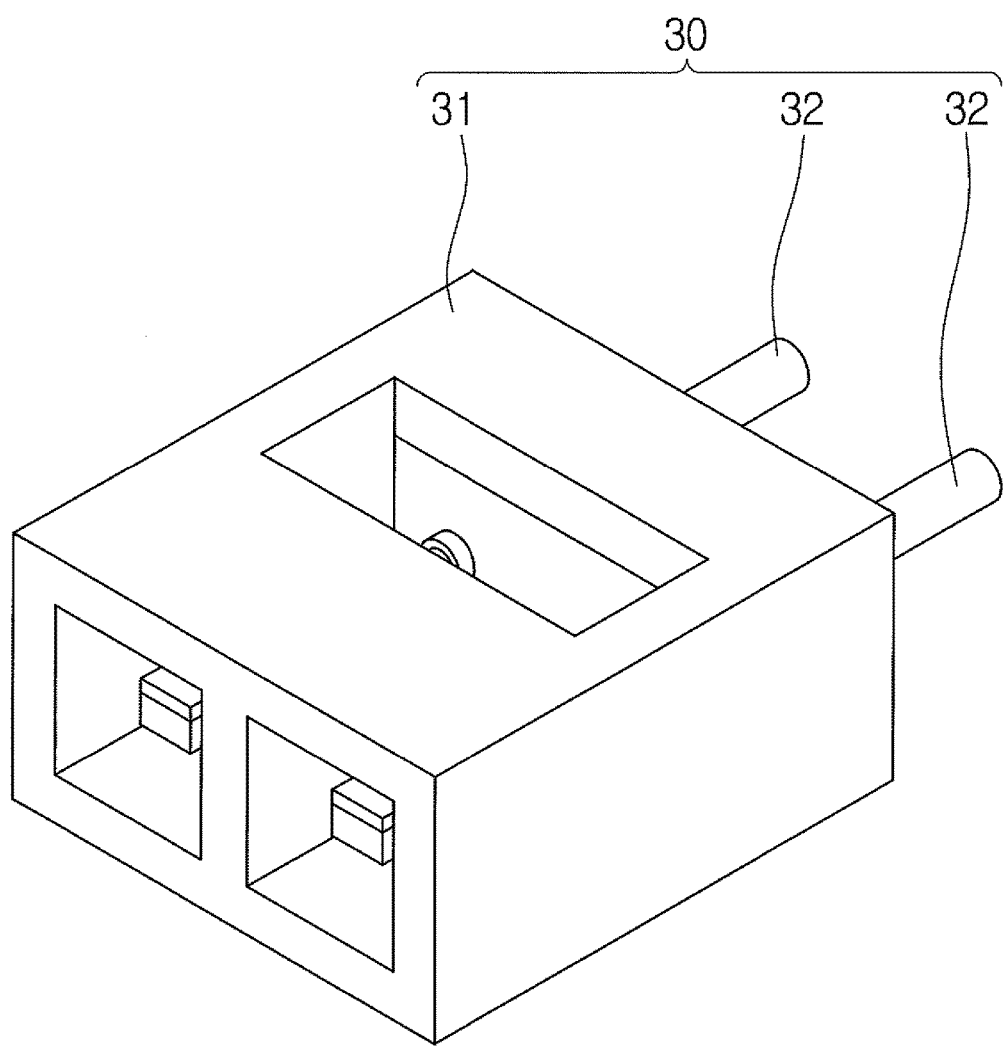
FIG. 17 is a perspective view of a harness (fourth exemplary embodiment)

As shown in FIG. 17, a harness 30 includes a connector 31 and two wires 32.

Figure 18:
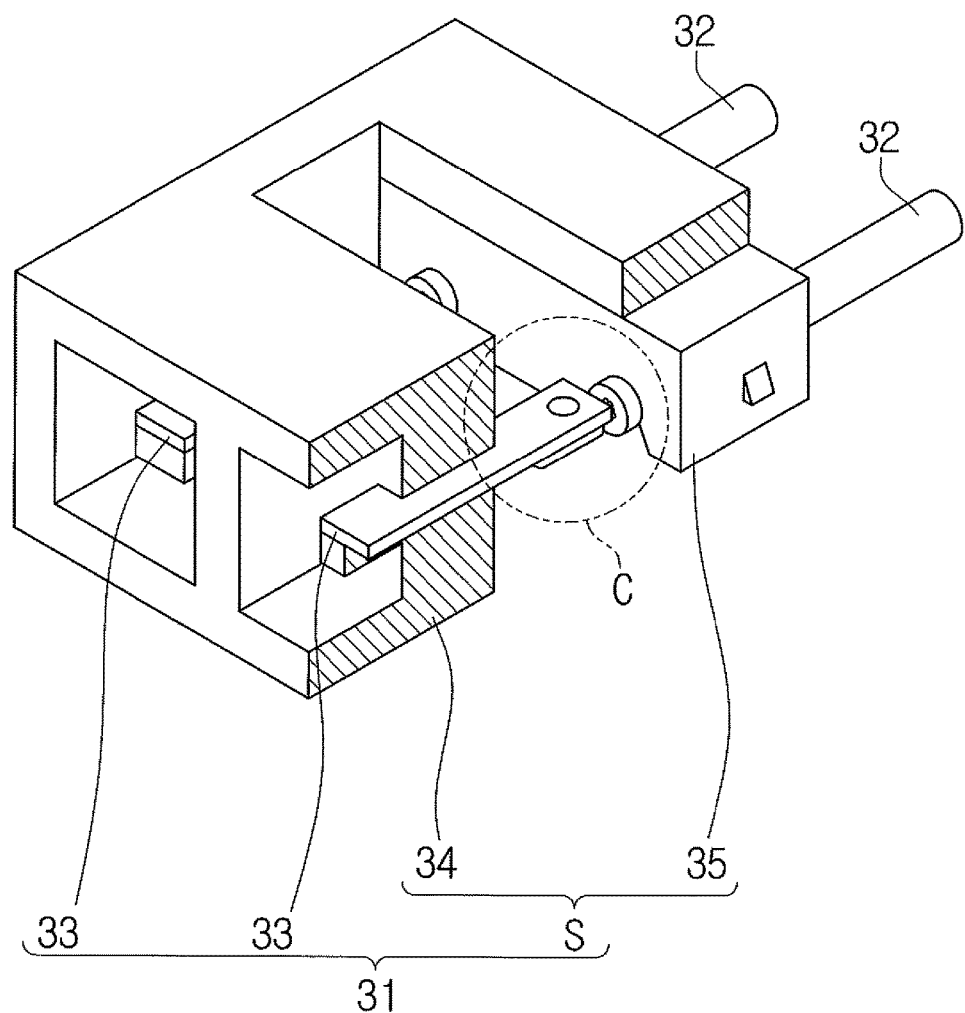
FIG. 18 is a partially cutaway perspective view of the harness (fourth exemplary embodiment)

As shown in FIG. 18, the connector 31 includes two terminals 33 and a housing S (fixing structure body). The housing S includes a terminal holding body 34 and a wire holding body 35.

Figure 19:
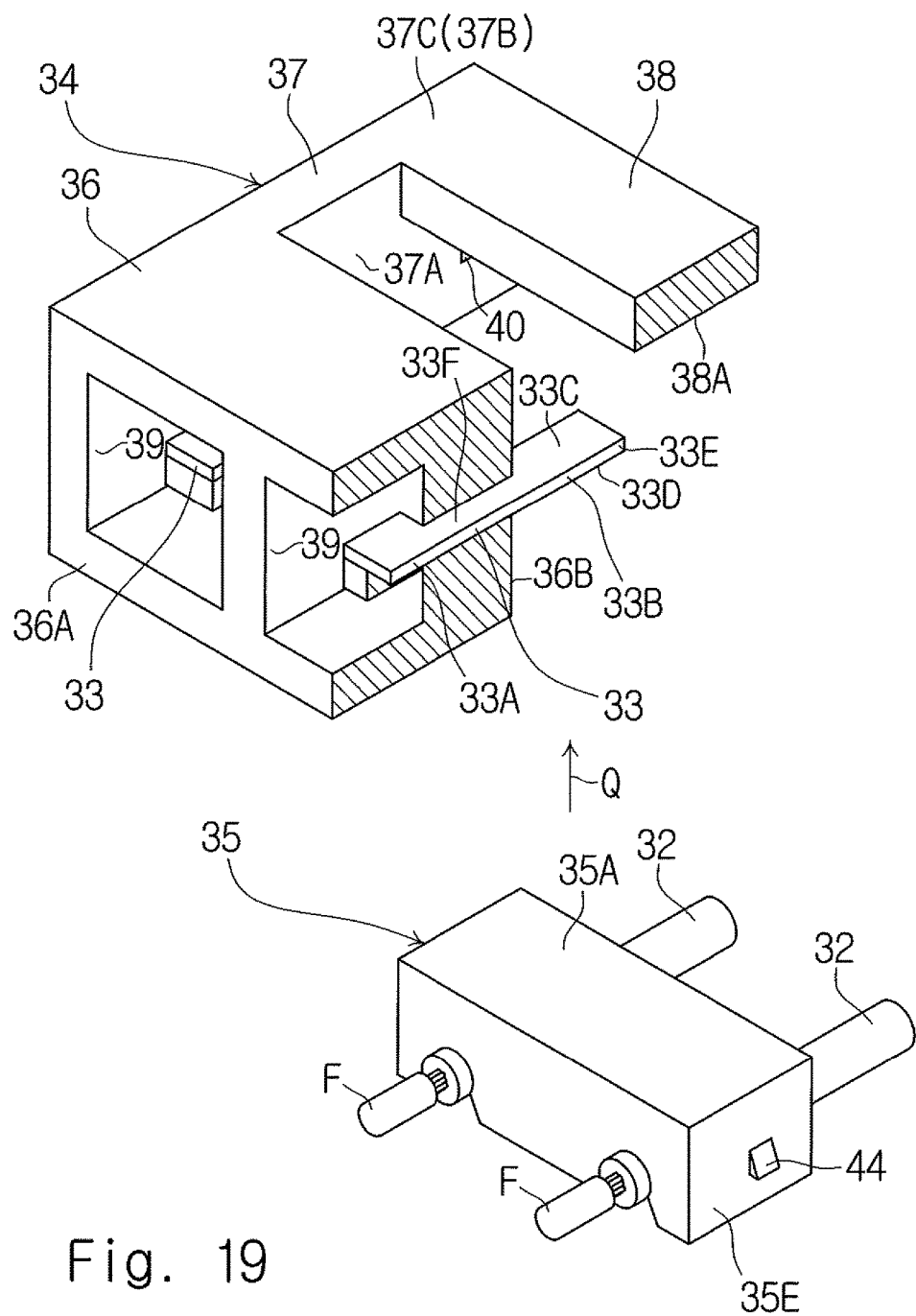
FIG. 19 is an exploded perspective view of the harness (fourth exemplary embodiment)

As shown in FIG. 19, the terminal holding body 34 is a portion that holds the two terminals 33. The terminal holding body 34 includes a substantially rectangular parallelepiped mating portion 36, two rear projecting portions 37 (also see FIG. 17), and a coupling beam 38. The mating portion 36 is a portion to be mated with a mating connector. Two mating dents 39 are formed in a front surface 36A of the mating portion 36. The two rear projecting portions 37 are formed so as to project backward from a back surface 36B of the mating portion 36. The two rear projecting portions 37 are disposed separately at right and left sides. A lock dent 40 is formed in an inner surface 37A of each rear projecting portion 37. The coupling beam 38 couples upper ends 37C of rear ends 37B of the respective rear projecting portions 37. The coupling beam 38 includes a lower surface 38A. The terminal holding body 34 is formed of an insulating resin.

Each terminal 33 is elongated in a front-back direction. Each terminal 33 is held on the terminal holding body 34 by insert molding. Each terminal 33 includes: a contact portion 33A that projects within the corresponding mating dent 39; an embedded portion 33F that is embedded in the terminal holding body 34; and a fixed portion 33B that projects backward from the back surface 36B. The fixed portion 33B includes an upper surface 33C, a lower surface 33D (fixed surface), and two side surfaces 33E. Each terminal 33 is formed of a Cu-based or Au-based metal. In the fourth exemplary embodiment, each terminal 33 is formed of a Cu-based metal and is plated with gold.

Figure 20:
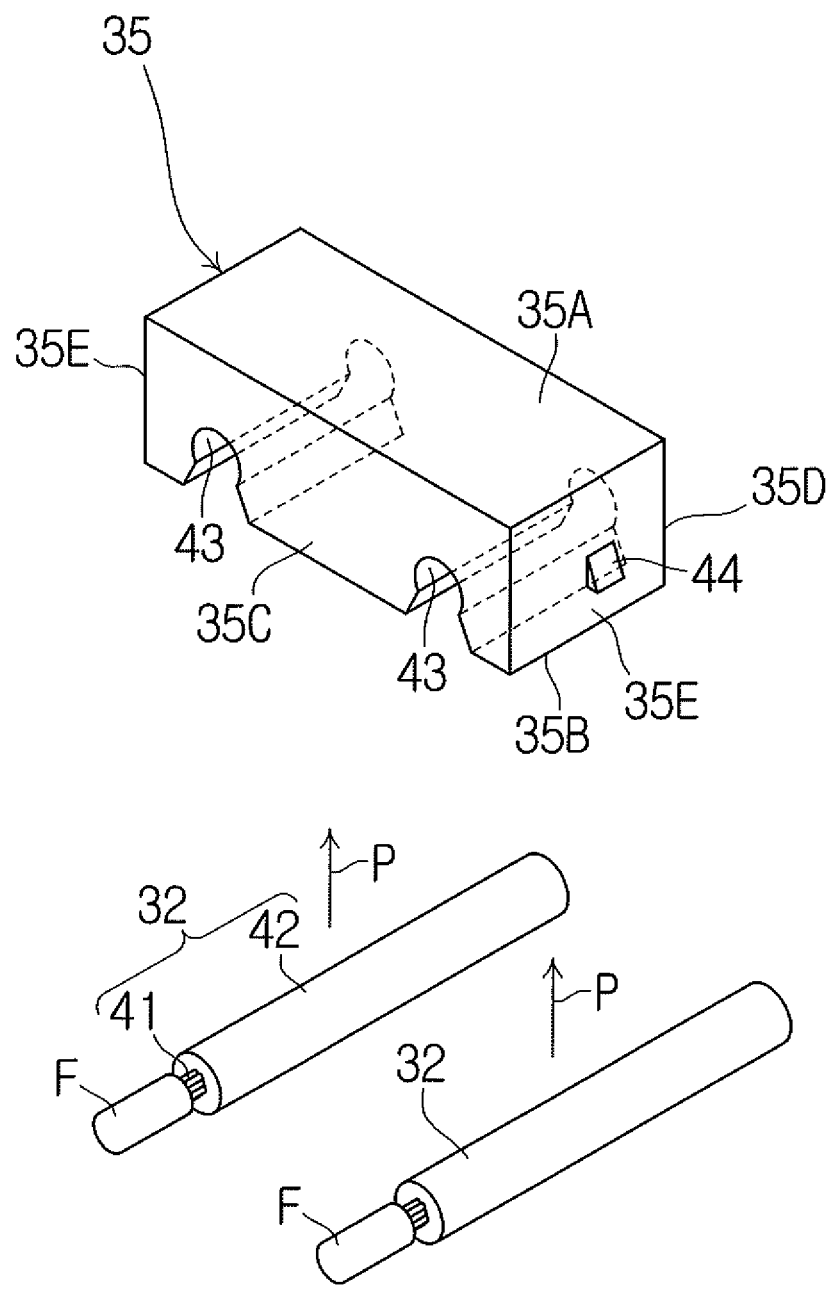
FIG. 20 is a view showing a state in which wires are removed from a wire holding body (fourth exemplary embodiment)

As shown in FIG. 20, each wire 32 includes a conductor 41 and an insulating coating 42 for coating the conductor 41. The conductor 41 is formed of, for example, a Cu-based or Al-based metal, and is a solid wire or a strand. In the fourth exemplary embodiment, the conductor 41 is a Cu-based metal and is formed as a strand. The conductor 41 is exposed by a predetermined length by partially removing the insulating coating 42. As shown in FIG. 20, the brazing filler metal F is deposited on the conductor 41 of each wire 32 due to wetting phenomena.

The wire holding body 35 is a portion that holds the two wires 32. The wire holding body 35 includes an upper surface 35A, a lower surface 35B, a front surface 35C, a back surface 35D, and two side surfaces 35E. The two side surfaces 35E are parallel to each other. The lower surface 35B has two wire holding grooves 43 each extending in the front-back direction. Each wire holding groove 43 is formed to have a substantially ohm-shaped section so that each wire 32 accommodated in the corresponding wire holding groove 43 is prevented from being removed from the corresponding wire holding groove 43. In other words, when each wire 32 is inserted into the corresponding wire holding groove 43, each wire 32 is held by the wire holding body 35. Lock claws 44 are formed on the respective side surfaces 35E. The wire holding body 35 is formed of an insulating resin having flexibility, such as a nylon-based resin or a polyester-based resin.

With the structure described above, each wire 32 is inserted into the corresponding wire holding grooves 43 in a direction indicated by an arrow P in FIG. 20 and the wire holding body 35 is inserted between the two rear projecting portions 37 of the terminal holding body 34 in a direction indicated by an arrow Q in FIG. 19. As a result, the upper surface 35A of the wire holding body 35 is opposed to the lower surface 38A of the coupling beam 38 of the terminal holding body 34; the two side surfaces 35E of the wire holding body 35 are respectively opposed to the inner surfaces 37A of the two rear projecting portions 37 of the terminal holding body 34; and the two lock claws 44 of the wire holding body 35 respectively engage with the two lock dents 40 of the terminal holding body 34. Thus, the wire holding body 35 is mated to the terminal holding body 34 and the wire holding body 35 is held by the terminal holding body 34. A fitting mechanism for regulating disengagement of the wire holding body 35 after the wire holding body 35 is mated to the terminal holding body 34 may be provided instead of the lock claws 44.

Figure 21:
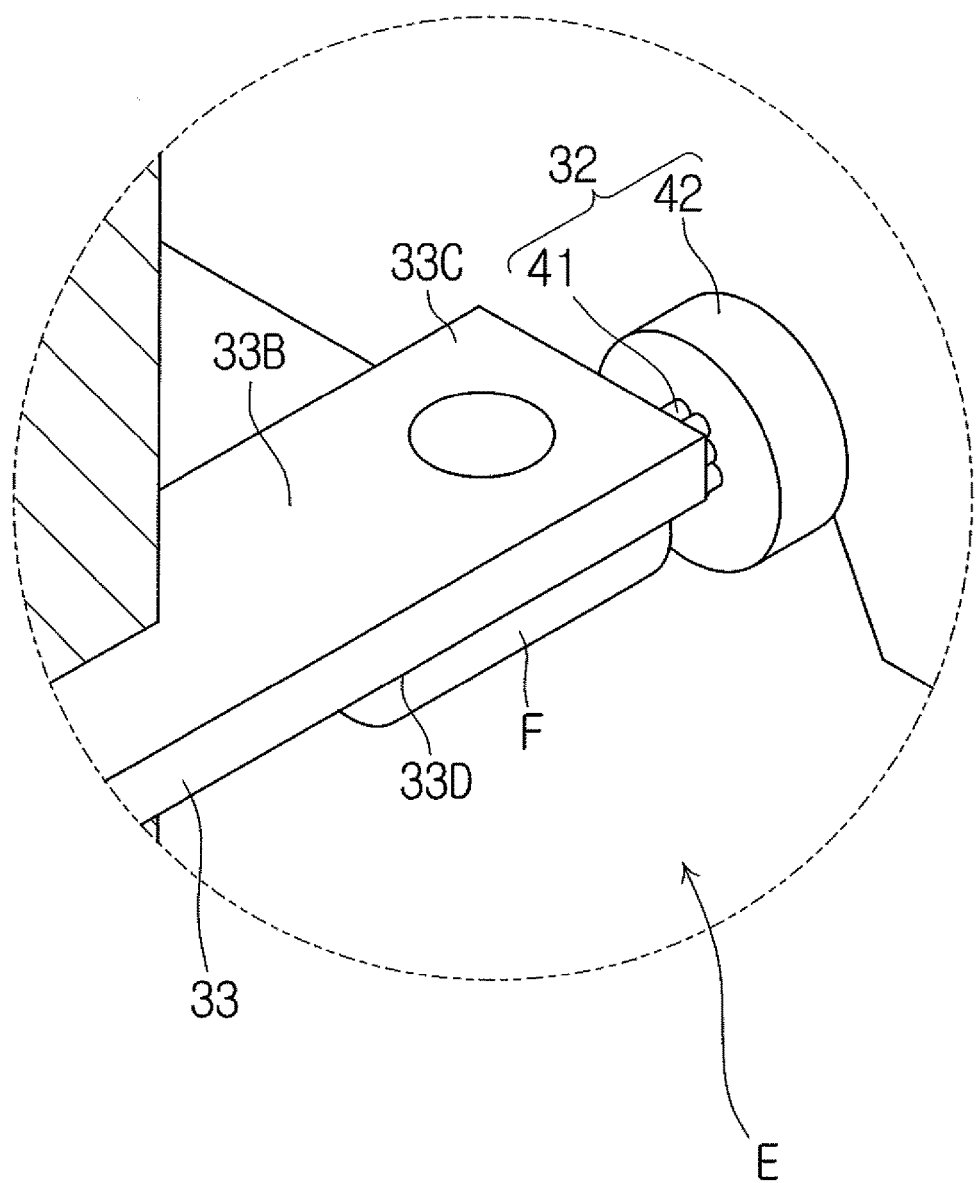
FIG. 21 is an enlarged view of a portion "C" shown in FIG. 18 (fourth exemplary embodiment)

FIG. 21 shows an enlarged view of a portion "C" shown in FIG. 18. As shown in FIG. 21, the fixed portion 33B of each terminal 33 is fixed to the conductor 41 of each wire 32 with the brazing filler metal F disposed therebetween. One wire 32 including the conductor 41, the brazing filler metal F wetting the conductor 41, and the fixed portion 33B of one terminal 33 constitute the fixing structure E. In the fourth exemplary embodiment, the brazing filler metal F is a solder.

Figure 22:
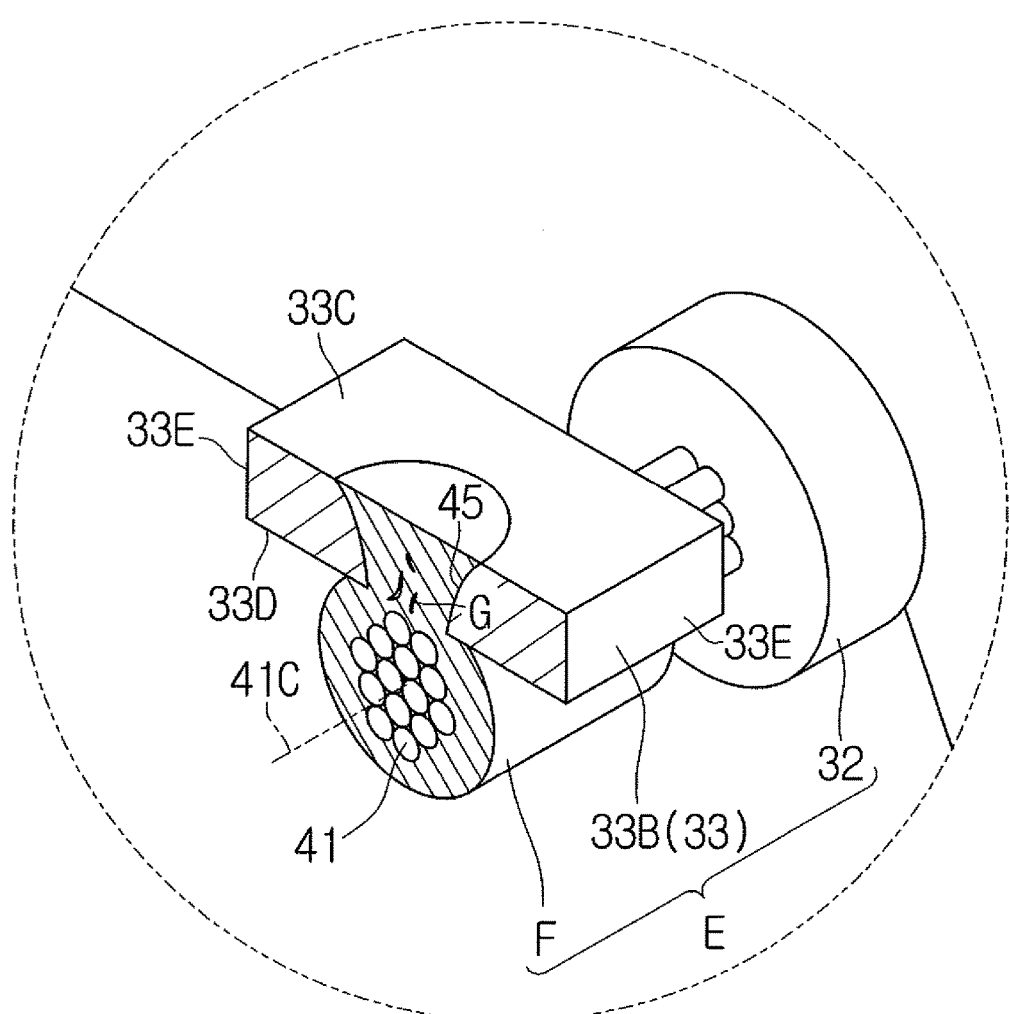
FIG. 22 is a partially cutaway perspective view of a fixing structure (fourth exemplary embodiment)
Figure 23:
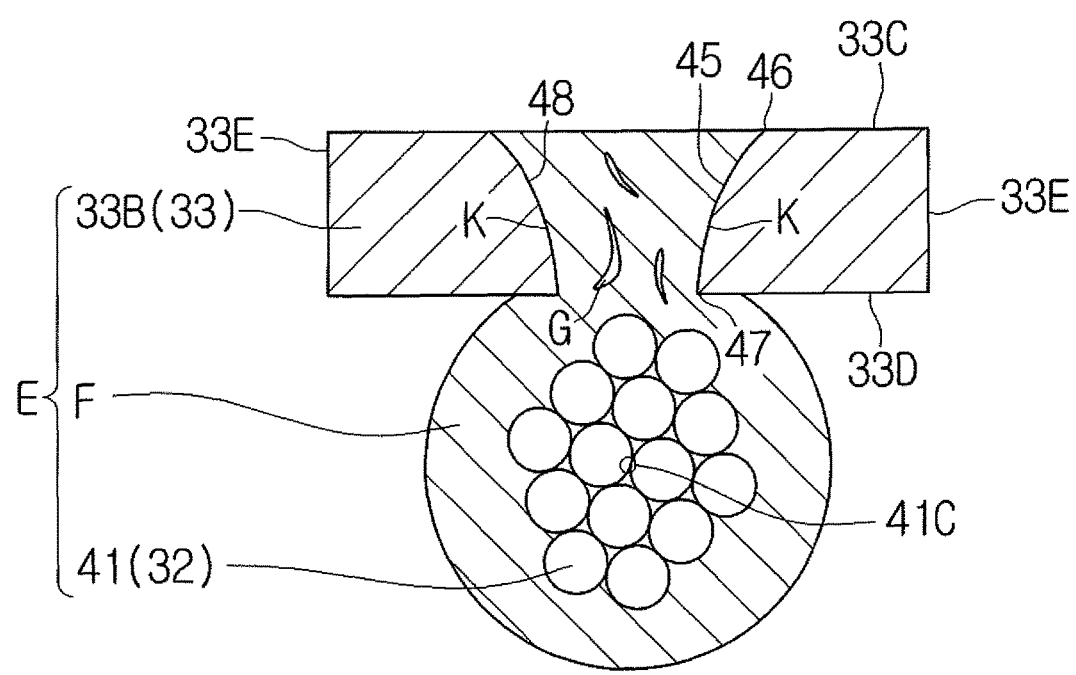
FIG. 23 is a sectional view of the fixing structure (fourth exemplary embodiment)

The fixing structure E will be described in detail below with reference to FIGS. 22 and 23. FIG. 22 is a partially cutaway perspective view of the fixing structure E. FIG. 23 is a sectional view of the fixing structure E.

As shown in FIGS. 22 and 23, the conductor 41 is opposed to the lower surface 33D of the fixed portion 33B. The conductor 41 extends in the front-back direction. Accordingly, the longitudinal direction of the terminal 33 and the longitudinal direction of the conductor 41 are parallel to each other.

The brazing filler metal F and the conductor 41 are fixed to each other due to wetting phenomena. The brazing filler metal F is melted and solidified, which allows the brazing filler metal F and the conductor 41 to be fixed to each other.

The brazing filler metal F and the fixed portion 33B are fixed to each other with the brazing filler metal F extending within the fixed portion 33B in such a manner that the brazing filler metal F gradually increases in width in a direction apart from a central axis 41C of the conductor 41. The brazing filler metal F present in the fixed portion 33B gradually increases in width in the direction apart from the central axis 41C of the conductor 41. The brazing filler metal F present in the fixed portion 33B gradually widens in the direction apart from the central axis 41C of the conductor 41.

Specifically, a penetrating hole 45 that penetrates the fixed portion 33B in a direction orthogonal to the lower surface 33D is formed in the fixed portion 33B. As shown in FIG.

23, the penetrating hole 45 has a substantially circular upper opening 46 (upper end) that is opened at the upper surface 33C, and a substantially circular lower opening 47 that is opened at the lower surface 33D. The diameter of the upper opening 46 is larger than the diameter of the lower opening 47. In other words, the opening area of the upper opening 46 is larger than the opening area of the lower opening 47. Accordingly, the penetrating hole 45 gradually increases in width in the direction apart from the central axis 41C of the conductor 41. The penetrating hole 45 gradually widens in the direction apart from the central axis 41C of the conductor 41. An inner peripheral surface 48 of the penetrating hole 45 is curved to be convex inward. In other words, two boundary lines K (boundaries) between the fixed portion 33B and the brazing filler metal F extending within the fixed portion 33B are curved to be convex inward in a section of the fixing structure E. The brazing filler metal F penetrates the penetrating hole 45 of the fixed portion 33B vertically. The brazing filler metal F is exposed at the upper surface 33C of the fixed portion 33B. The brazing filler metal F is filled in the penetrating hole 45 of the fixed portion 33B. The brazing filler metal F gradually increases in width in the direction apart from the central axis 41C of the conductor 41. The brazing filler metal F extends within the penetrating hole 45, which is gradually narrowed toward the central axis 41C of the conductor 41, in such a manner that the brazing filler metal F gradually increases in width in the direction apart from the central axis 41C of the conductor 41. This structure allows the fixed portion 33B and the brazing filler metal F to be fixed to each other.

In the vicinity of the lower surface 33D of the fixed portion 33B, the metal G having the same metal component as the metal component of the terminal 33 is present slightly irregularly in the brazing filler metal F.

The fourth exemplary embodiment described above has the following features.

The fixing structure E includes: the wire 32 including the conductor 41; the brazing filler metal F wetting the conductor 41; and the terminal 33. The terminal 33 is fixed to the conductor 41 by the brazing filler metal F. The brazing filler metal F extends within the terminal 33 in such a manner that the brazing filler metal F gradually increases in width in the direction apart from the central axis 41C of the conductor 41, thereby allowing the terminal 33 and the brazing filler metal F to be fixed to each other. In other words, the penetrating hole 45 is formed in the terminal 33, the penetrating hole 45 being gradually widened in a direction apart from the central axis 41C of the conductor 41, and the penetrating hole 45 is filled with the brazing filler metal F. According to the above structure, the terminal 33 and the brazing filler metal F are firmly fixed to each other.

The fixing structure E includes at least: one wire 32 including the conductor 41, the brazing filler metal F, and one terminal 33.

The brazing filler metal F penetrates the terminal 33 and reaches the vicinity of the upper surface 33C of the terminal 33. According to the above structure, the state in which the terminal 33 and the brazing filler metal F are fixed to each other can be confirmed by visually recognizing the brazing filler metal F when the upper surface 33C of the terminal 33 is viewed from above.

As shown in FIG. 23, the boundary lines K between the terminal 33 and the brazing filler metal F extending within the terminal 33 are curved. In other words, the boundary lines K between the penetrating hole 45 and the brazing filler metal F are curved. According to the above structure, the contact area between the terminal 33 and the brazing filler metal F is larger than that in a case where the boundary lines K are straight lines. Thus, the terminal 33 and the brazing filler metal F are more firmly fixed to each other.

Further, as shown in FIG. 23, the boundary lines K between the terminal 33 and the brazing filler metal F extending within the terminal 33 are curved to be convex inward. In other words, the boundary lines K between the penetrating hole 45 and the brazing filler metal F are curved to be convex inward. According to the above structure, the volume of the internal space of the penetrating hole 45 can be reduced as compared with a case where the boundary lines K are curved to be convex outward. Thus, the usage of the brazing filler metal F can be reduced.

Note that each boundary line K may look like a solid line, a dashed line, a dotted line, a dashed-dotted line, or an alternate long and two short dashes line.

The fixing structure E further includes the housing S (fixing structure body) including the wire holding body 35 that holds two wires 32, and the terminal holding body 34 that holds two terminals 33. The wire holding body 35 and the terminal holding body 34 are mated together. According to the above structure, when the terminal 33 and the conductor 41 are fixed to each other, the conductor 41 can be accurately positioned with respect to the terminal 33.

In the exemplary embodiments described above, the penetrating hole 45 that penetrates the fixed portion 33B in the direction orthogonal to the lower surface 33D is formed in the fixed portion 33B. Alternatively, the penetrating hole 45 may be formed in such a manner that the penetrating hole 45 penetrates the fixed portion 33B in a direction oblique to the lower surface 33D.

(Fifth Exemplary Embodiment)

Next, a fifth exemplary embodiment will be described with reference to FIGS. 24 and 25. Differences between the fourth exemplary embodiment and the fifth embodiment will be mainly described, while a repeat of previous descriptions is omitted.

As shown in FIG. 23, in the fourth exemplary embodiment described above, the brazing filler metal F penetrates the terminal 33 and reaches the vicinity of the upper surface 33C of the fixed portion 33B.

Figure 24:
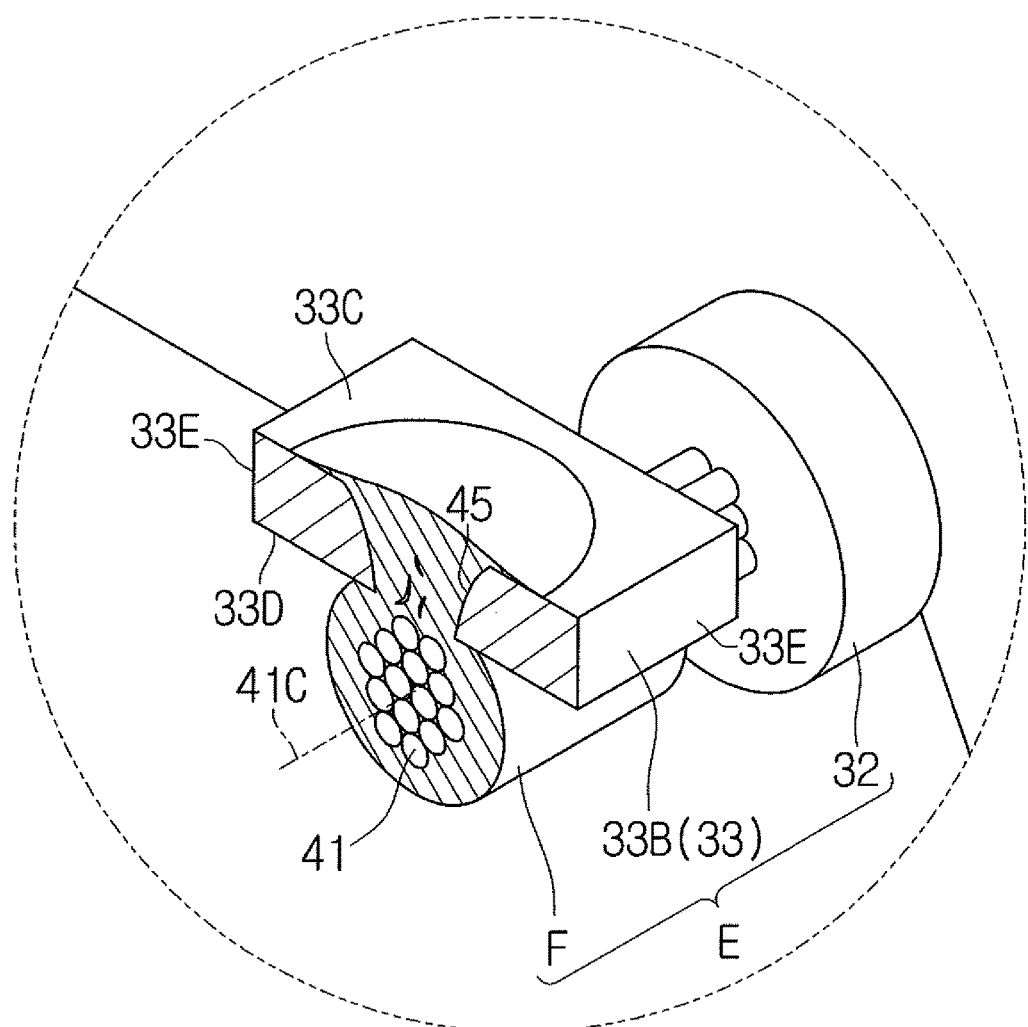
FIG. 24 is a partially cutaway perspective view of a fixing structure (fifth exemplary embodiment)
Figure 25:
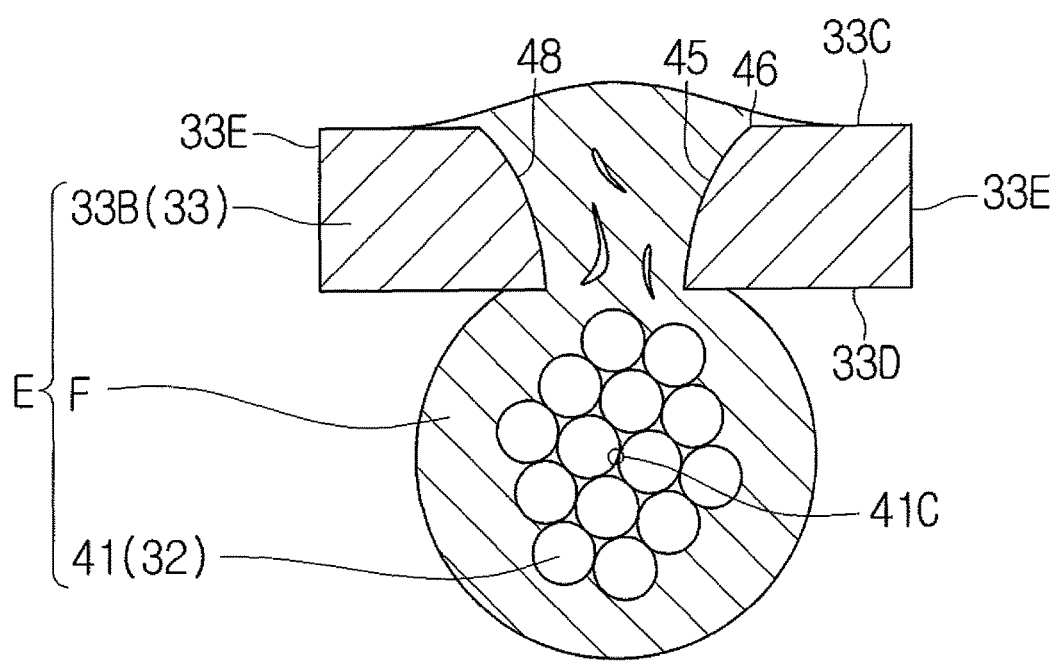
FIG. 25 is a sectional view of the fixing structure (fifth exemplary embodiment)

In contrast, in the fifth exemplary embodiment, as shown in FIGS. 24 and 25, the brazing filler metal F penetrates the terminal 33 and spreads over the upper surface 33C of the fixed portion 33B in a substantially circular shape. Specifically, as shown in FIG. 25, the brazing filler metal F extends in a substantially circular shape to the outside of the upper opening 46 of the penetrating hole 45. The brazing filler metal F is deposited on the upper surface 33C of the fixed portion 33B at the outside of the upper opening 46 of the penetrating hole 45.

According to the above structure, the state in which the terminal 33 and the brazing filler metal F are fixed to each other can be confirmed by visually recognizing the brazing filler metal F when the upper surface 33C of the terminal 33 is viewed from above. Further, since the area of the brazing filler metal F when the upper surface 33C of the terminal 33 is viewed from above is larger than that of the fourth exemplary embodiment described above, the brazing filler metal F can be easily recognized visually when the upper surface 33C of the terminal 33 is viewed from above. Furthermore, since the brazing filler metal F spreads over the upper surface 33C of the fixed portion 33B, the fixed portion 33B and the brazing filler metal F are more firmly fixed to each other as compared with the fourth exemplary embodiment in which the brazing filler metal F does not spread over the upper surface 33C of the fixed portion 33B.

(Sixth Embodiment)

Next, a sixth embodiment will be described with reference to FIGS. 26 and 27. Differences between the fourth exemplary embodiment and the sixth embodiment will be mainly described, while a repeat of previous descriptions is omitted.

As shown in FIG. 23, in the fourth exemplary embodiment described above, the brazing filler metal F penetrates the terminal 33 and reaches the vicinity of the upper surface 33C of the fixed portion 33B.

Figure 26:
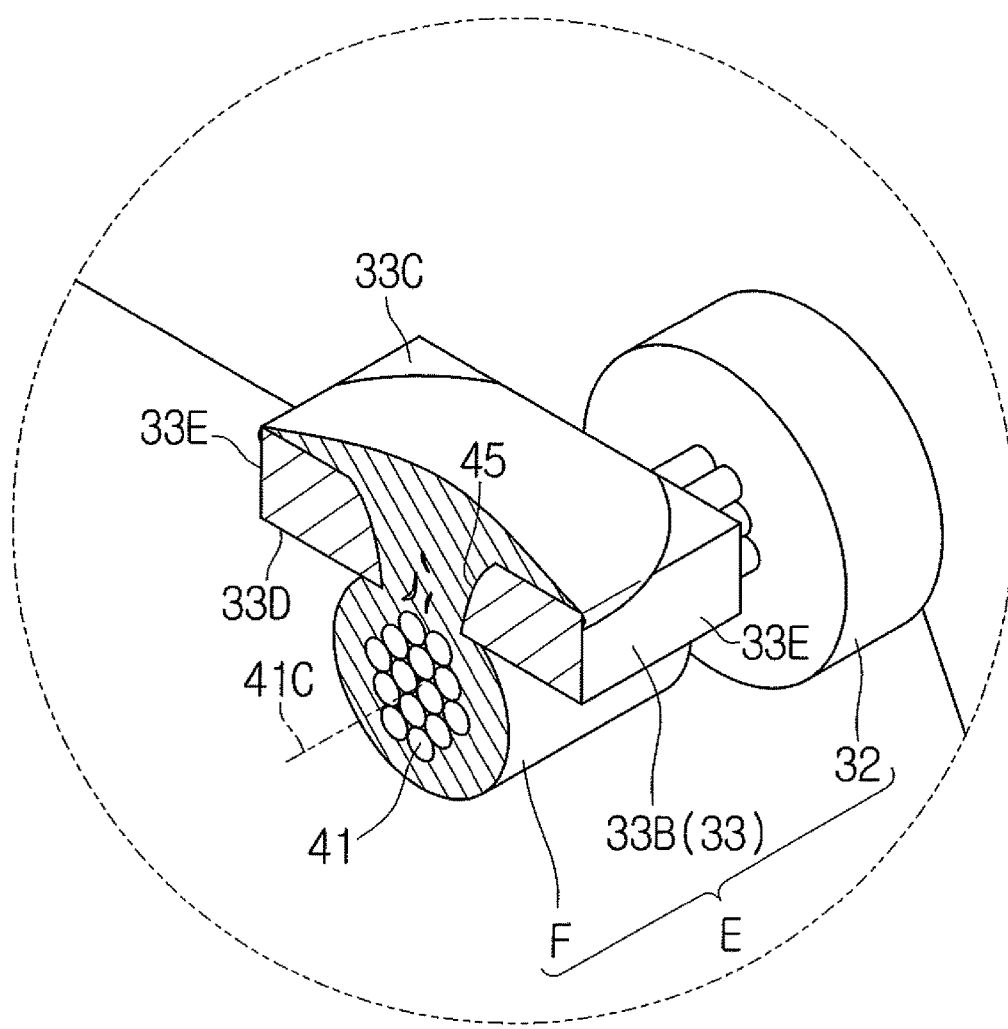
FIG. 26 is a partially cutaway perspective view of a fixing structure (sixth exemplary embodiment)
Figure 27:
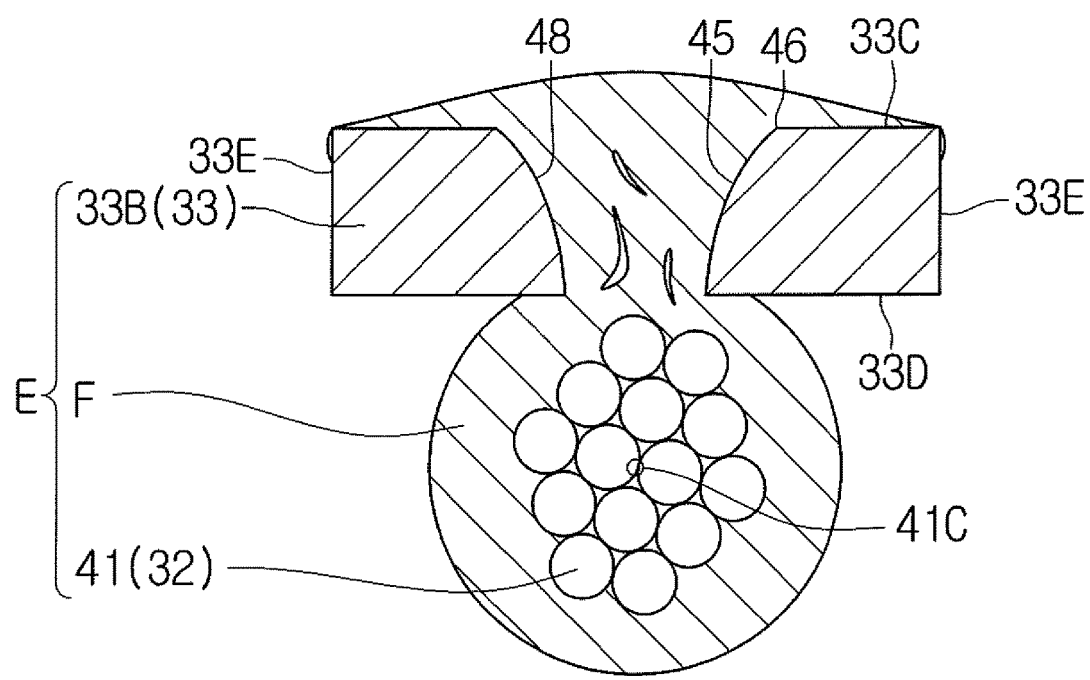
FIG. 27 is a sectional view of the fixing structure (sixth exemplary embodiment)

In contrast, in the sixth exemplary embodiment, as shown in FIGS. 26 and 27, the brazing filler metal F penetrates the terminal 33 and spreads over the upper surface 33C of the fixed portion 33B in a substantially circular shape. Specifically, as shown in FIG. 27, the brazing filler metal F extends in a substantially circular shape to the outside of the upper opening 46 of the penetrating hole 45, and reaches the two side surfaces 33E. Further, the brazing filler metal F is deposited on the upper surface 33C and the two side surfaces 33E of the fixed portion 33B at the outside of the upper opening 46 of the penetrating hole 45.

According to the above structure, the state in which the terminal 33 and the brazing filler metal F are fixed to each other can be confirmed by visually recognizing the brazing filler metal F when the upper surface 33C of the terminal 33 is viewed from above. Further, since the area of the brazing filler metal F when the upper surface 33C of the terminal 33 is viewed from above is larger than that of the fourth exemplary embodiment described above, the brazing filler metal F can be easily recognized visually when the upper surface 33C of the terminal 33 is viewed from above. Furthermore, since the brazing filler metal F spreads over the upper surface 33C of the fixed portion 33B, the fixed portion 33B and the brazing filler metal F are more firmly fixed to each other as compared with the fourth exemplary embodiment in which the brazing filler metal F does not spread over the upper surface 33C of the fixed portion 33B.

(Fixing Method)

Figure 28:
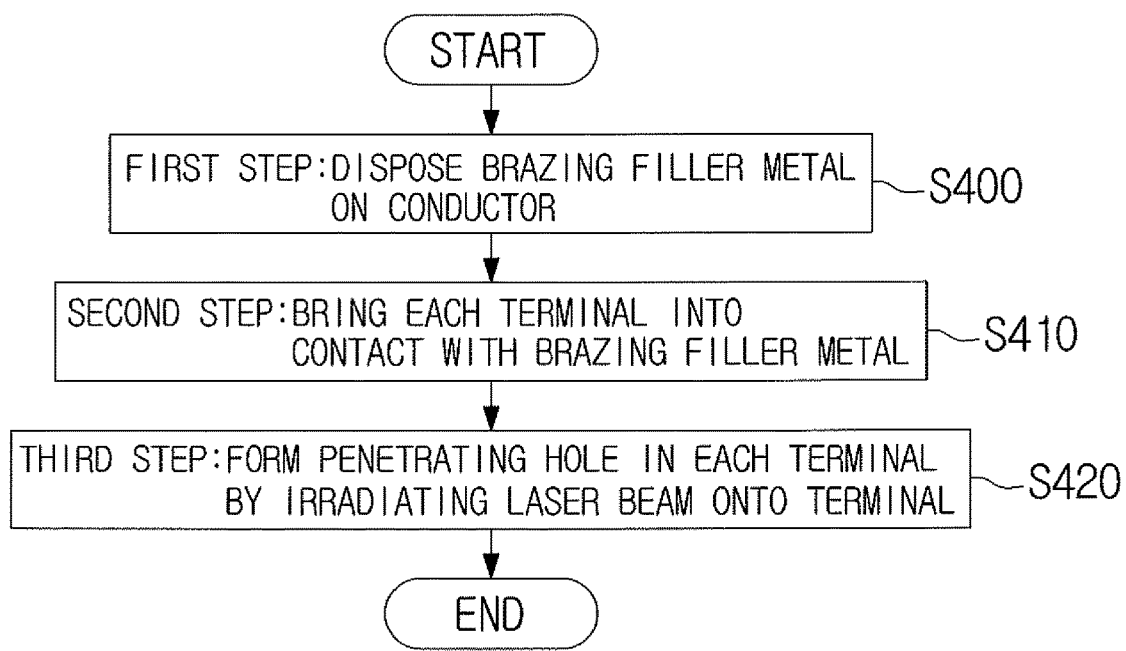
FIG. 28 is a flowchart showing a fixing method.
Figure 29:
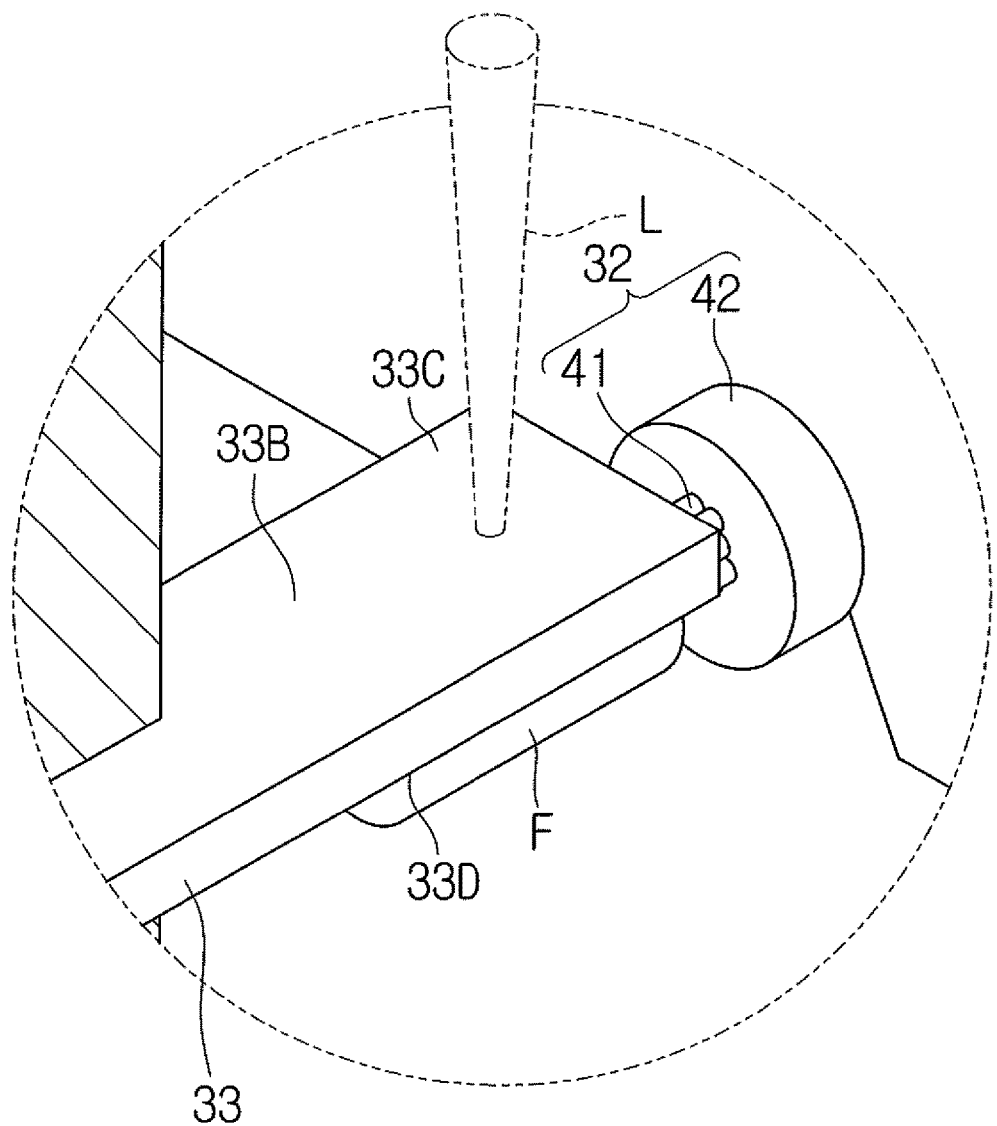
FIG. 29 is a perspective view showing a state in which a laser beam is irradiated onto an upper surface of a fixed portion of each terminal.
Figure 30:
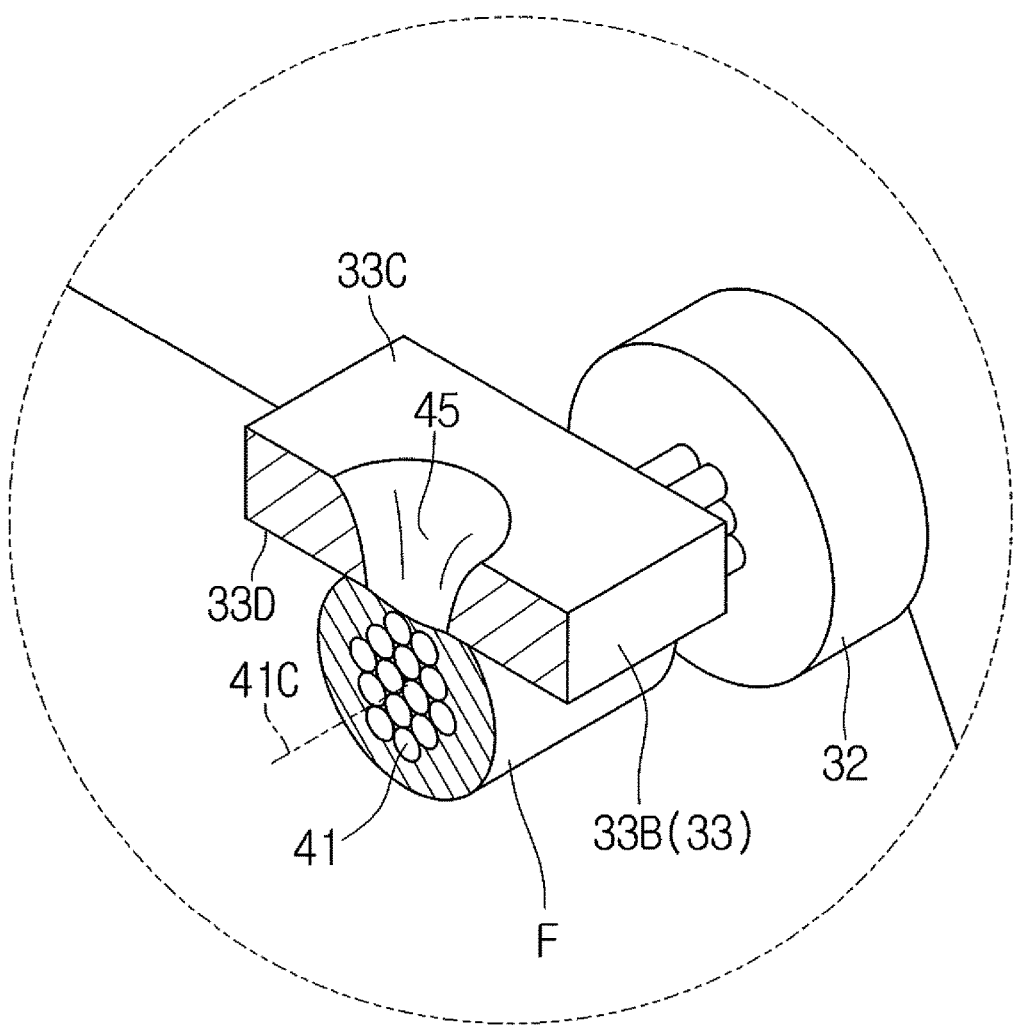
FIG. 30 is a perspective view showing a state in which a penetrating hole is formed in each terminal.

A fixing method for fixing each terminal 33 to the corresponding conductor 41 of the wire 32 with the brazing filler metal F disposed therebetween will be described below with reference to FIGS. 28 to 30. FIG. 28 is a flowchart showing the fixing method. FIGS. 29 and 30 are views showing each process of the fixing method.

As shown in FIG. 28, the fixing method includes a first step (S400), a second step (S410), and a third step (S420) in this order. The first step (S400), the second step (S410), and the third step (S420) will be described below in this order.

(First Step: S400)

In the first step, the brazing filler metal F is disposed on the conductor 41. Specifically, the brazing filler metal F is disposed on the conductor 41 by wetting the conductor 41 with the brazing filler metal F.

(Second Step: S410)

In the second step, the terminal 33 is brought into contact with the brazing filler metal F as described in detail below.

That is, the wire holding body 35 and the terminal holding body 34 are mated together in the direction indicated by the arrow Q in FIG. 19, thereby bringing the terminal 33 into contact with the brazing filler metal F. At this time, the brazing filler metal F is pressed against the terminal 33, while the conductor 41 is subjected to a slight bending deformation.

(Third Step: S420)

In the third step, the laser beam L is irradiated onto the fixed portion 33B of each terminal 33, thereby forming the penetrating hole 45 in the fixed portion 33B of each terminal 33 as described in detail below.

That is, as shown in FIG. 29, a laser oscillator (not shown) irradiates the laser beam L onto the upper surface 33C (laser beam irradiation surface) of the fixed portion 33B of each terminal 33. The wavelength of the laser beam L irradiated onto the upper surface 33C of the fixed portion 33B of each terminal 33 is preferably, for example, 600 nm or less. The laser beam L having a wavelength of 600 nm or less has a high absorptance with respect to a Cu-based or Au-based metal, which enables each terminal 33 to be melted in a short period of time. Examples of the laser beam L having a wavelength of 600 nm or less include the second harmonic of YAG laser. The wavelength of the second harmonic of YAG laser is 532 nm. The third harmonic or the fourth harmonic of YAG laser may be used instead of the second harmonic of YAG laser. Other lasers such as a $CO_2$ laser or an excimer laser may be used instead of the YAG laser. The irradiation position of the laser beam L is within the region in which the fixed portion 33B of each terminal 33, the brazing filler metal F disposed on the conductor 41, and the conductor 41 overlap each other in the irradiation direction of the laser beam L.

When the laser beam L is irradiated onto the upper surface 33C of the fixed portion 33B of each terminal 33, the fixed portion 33B of each terminal 33 is locally vaporized, and as shown in FIG. 30, the penetrating hole 45 (key hole) extending vertically is formed in the fixed portion 33B of each terminal 33. The penetrating hole 45 is formed in such a manner that the penetrating hole 45 is gradually narrowed toward the central axis 41C of the conductor 41.

After the irradiation of the laser beam L is finished, the melted brazing filler metal F enters the penetrating hole 45 and the brazing filler metal F is solidified within the penetrating hole 45 as shown in FIGS. 22 to 27. Thus, the fixed portion 33B of each terminal 33 and the brazing filler metal F are fixed to each other. The irradiation conditions, such as the wavelength of the laser beam L and the irradiation time, may be set so that the brazing filler metal F melted by the irradiation of the laser beam L enters the penetrating hole 45 and reaches the vicinity of the upper opening 46 (upper end) of the penetrating hole 45 as shown in FIGS. 22 to 27.

Various principles can be applied as the principle that the melted brazing filler metal F enters the penetrating hole 45, but the present inventors consider as follows.

That is, first, when the laser beam L is irradiated onto the fixed portion 33B of each terminal 33, the fixed portion 33B of each terminal 33 is locally vaporized and the penetrating hole 45 is formed, and at the same time, the entire brazing filler metal F is melted once. When the laser beam L is irradiated onto the fixed portion 33B of each terminal 33, the fixed portion 33B of each terminal 33 is pressed against the brazing filler metal F, so that an external force to compress the brazing filler metal F acts on the melted brazing filler metal F. Due to the external force, the melted brazing filler metal F enters the penetrating hole 45 in such a manner that the brazing filler metal F is pressed out to the penetrating hole 45 and is pressed into the penetrating hole 45.

The brazing filler metal F disposed on the conductor 41 in the first step (S400) is not formed with a thickness of about 0.1 to several micrometers, which are implemented in the plating process, but is formed with a thickness of about several tens of micrometers to several hundreds of micrometers, which are implemented in, for example, the reflow process. It is estimated that the formation of the brazing filler metal F with such a thickness allows the brazing filler metal F to be melted and flow into the penetrating hole 45 of each terminal 33 before the heat generated in each terminal 33 by the irradiation of the laser beam L onto each terminal 33 defuses to the conductor 41.

Second, the melted brazing filler metal F is sucked into the penetrating hole 45 which is formed due to the irradiation of the laser beam L.

The fixing method described above has the following features.

The fixing method for fixing each terminal 33 to the conductor 41 (object to be fixed) with the brazing filler metal F disposed therebetween includes: the first step (S400) of disposing the brazing filler metal F on the conductor 41; the second step (S410) of bringing the terminal 33 into contact with the brazing filler metal F; and the third step (S420) of forming the penetrating hole 45 in the terminal 33 by irradiating the laser beam L onto the terminal 33. In the third step (S420), the laser beam L is irradiated onto the terminal 33 in such a manner that the brazing filler metal F melted by the irradiation of the laser beam L enters the penetrating hole 45 and reaches the vicinity of the upper opening 46 (upper end) of the penetrating hole 45. In other words, in the third step (S420), the laser beam L is irradiated onto the terminal 33 in such a manner that the penetrating hole 45 is filled with the brazing filler metal F melted by the irradiation of the laser beam L. According to the above method, when the brazing filler metal F enters the penetrating hole 45, the terminal 33 is fixed to the conductor 41 with the brazing filler metal F disposed therebetween. The present inventors consider that the fixation between the terminal 33 and the brazing filler metal F is not due to wetting phenomena. Accordingly, the irradiation time of the laser beam L per terminal can be reduced in comparison with the case where the fixation between the terminal 33 and the brazing filler metal F is due to wetting phenomena. According to the above method, since the brazing filler metal F reaches the vicinity of the upper opening 46 (upper end) of the penetrating hole 45, whether the terminal 33 and the brazing filler metal F are fixed to each other can be confirmed when the upper surface 33C (laser beam irradiation surface) of the terminal 33 is viewed from above.

In the third step (S420), the laser beam L may be irradiated onto the terminal 33 in such a manner that the brazing filler metal F melted by the irradiation of the laser beam L enters the penetrating hole 45, flows out of the upper opening 46 (upper end) of the penetrating hole 45, and spreads over the upper surface 33C (laser beam irradiation surface) of the terminal 33. In other words, in the third step (S420), the laser beam L may be irradiated onto the terminal 33 in such a manner that the brazing filler metal F melted by the irradiation of the laser beam L flows out of the upper opening 46 (upper end) of the penetrating hole 45, and spreads over the upper surface 33C (laser beam irradiation surface) of the terminal 33. According to the above method, whether the terminal 33 and the brazing filler metal F are fixed to each other can be more easily confirmed when the upper surface 33C (laser beam irradiation surface) of the terminal 33 is viewed from above. Further, since the brazing filler metal F spreads over the upper surface 33C of the fixed portion 33B, the fixed portion 33B and the brazing filler metal F are more firmly fixed to each other as compared with the case where the brazing filler metal F does not spread over the upper surface 33C of the fixed portion 33B.

In the third step (S420), the laser beam L is irradiated onto the terminal 33 while the terminal 33 is pressed against the brazing filler metal F. According to the above method, in the third step (S420), the brazing filler metal F enters the penetrating hole 45 more easily than in the case where the laser beam L is irradiated onto the terminal 33 without pressing the terminal 33 against the brazing filler metal F.

In the sixth exemplary embodiment, the brazing filler metal F is a solder. In the first step (S400), the brazing filler metal F can be disposed on the conductor 41 by wetting the conductor 41 with the solder.

The terminal 33 is formed of a Cu-based or Au-based metal. The brazing filler metal F is a solder. According to the above method, since the color of the terminal 33 is significantly different from the color of the brazing filler metal F, the terminal 33 and the brazing filler metal F can be easily distinguished from each other and recognized when the upper surface 33C (laser beam irradiation surface) of the terminal 33 is viewed from above.

In the second step (S410), the wire holding body 35 that holds the wire 32 and the terminal holding body 34 that holds the terminal 33 are mated together, thereby bringing the terminal 33 into contact with the brazing filler metal F. According to the above method, the brazing filler metal F can be brought into contact with the terminal 33 with a simple operation.

In the second step (S410), the wire holding body 35 that holds the wire 32 and the terminal holding body 34 that holds the terminal 33 are mated together, thereby bringing the terminal 33 into contact with the brazing filler metal F while the conductor 41 is subjected to a bending deformation. According to the above method, the brazing filler metal F can be brought into contact with the terminal 33 with a simple operation. In addition, a stable contact between the brazing filler metal F and the terminal 33 can be achieved.

According to the above exemplary embodiments, in the second step (S410), the terminal 33 is brought into contact with the brazing filler metal F, while the conductor 41 is subjected to a bending deformation, by mating the wire holding body 35 holding the wire 32 with the terminal holding body 34 holding the terminal 33. Alternatively, in the second step (S410), the terminal 33 may be brought into contact with the brazing filler metal F, while the terminal 33 is subjected to a bending deformation, by mating the wire holding body 35 holding the wire 32 with the terminal holding body 34 holding the terminal 33. In the second step (S410), the terminal 33 may be brought into contact with the brazing filler metal F, while both of the conductor 41 and the terminal 33 are subjected to a bending deformation, by mating the wire holding body 35 holding the wire 32 with the terminal holding body 34 holding the terminal 33.

In the above exemplary embodiments, the brazing filler metal F is a solder and the solder is a soft solder. Alternatively, a hard solder such as a silver solder, a gold solder, a copper solder, or a brass solder may be used as the brazing filler metal F.

First Modified Example

A first modified example will be described below with reference to FIG. 31. Differences between the first modified example and the fourth exemplary embodiment will be mainly described, while a repeat of previous descriptions is omitted.

In the fourth exemplary embodiment, when the laser beam L is irradiated onto the upper surface 33C of the fixed portion 33B of each terminal 33, the number of irradiation positions of the laser beam L is only one. Accordingly, as shown in FIG. 21, the brazing filler metal F appears as a circle on the upper surface 33C.

Figure 31:
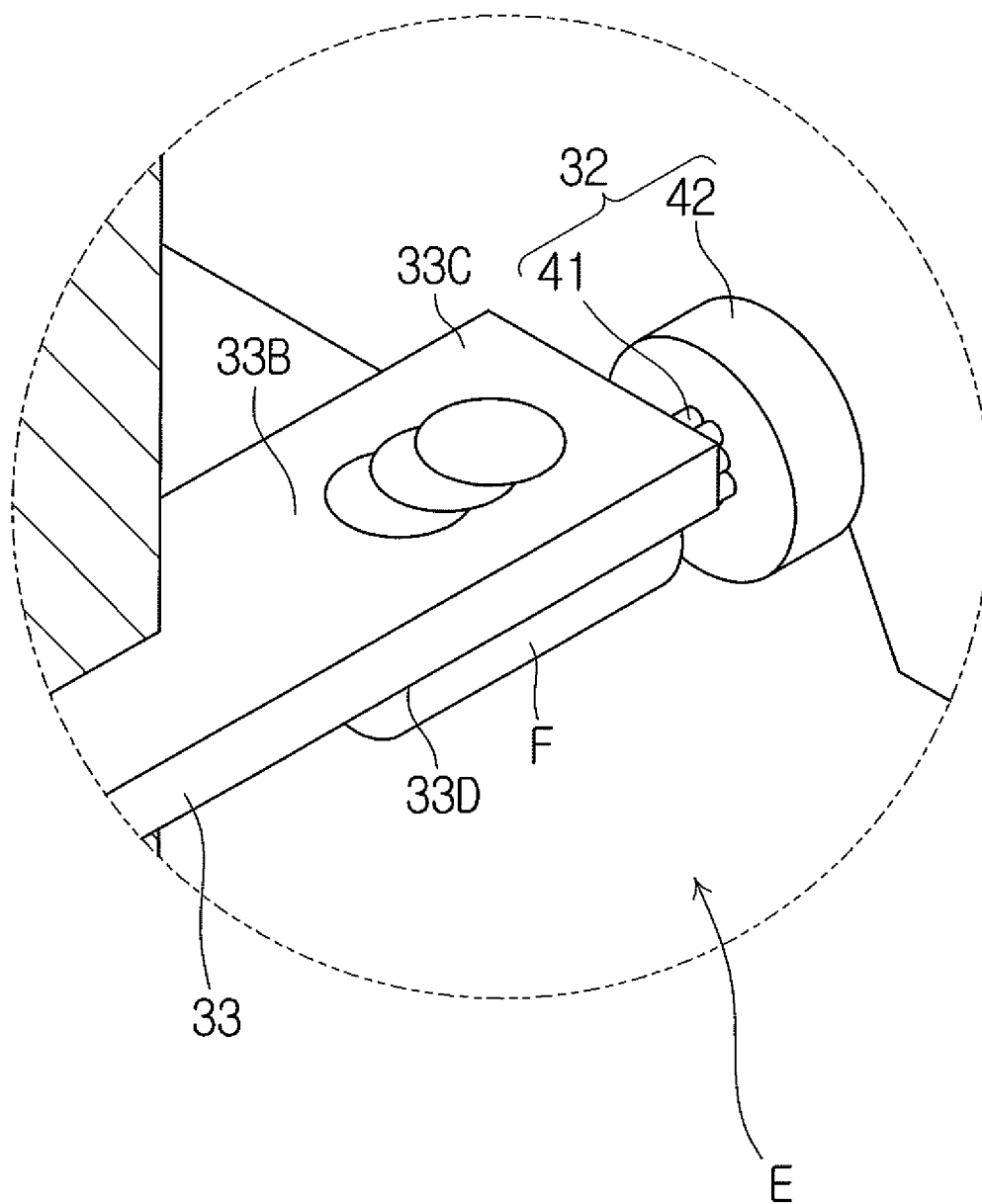
FIG. 31 is a view corresponding to FIG. 21 and showing a case where a laser beam is irradiated onto a plurality of locations (first modified example)

In contrast, in the first modified example, as shown in FIG. 31, the laser beam L may be irradiated at a plurality of different positions. The irradiation positions of the laser beam L are within the region in which the fixed portion 33B of each terminal 33, the brazing filler metal F, and the conductor 41 overlap each other in the irradiation direction of the laser beam L. Accordingly, as shown in FIG. 31, the brazing filler metal F appears as a plurality of circles partially overlapping each other on the upper surface 33C. When the position where the laser beam L is irradiated is moved linearly at a constant rate, the brazing filler metal F appears as an elliptic or oblong shape on the upper surface 33C.

Second Modified Example

A second modified example will be described below with reference to FIG. 32. Differences between the second modified example and the fourth exemplary embodiment will be mainly described, while a repeat of previous descriptions is omitted.

For example, as shown in FIG. 20, in the fourth exemplary embodiment, the two side surfaces 35E of the wire holding body 35 are parallel to each other.

Figure 32:
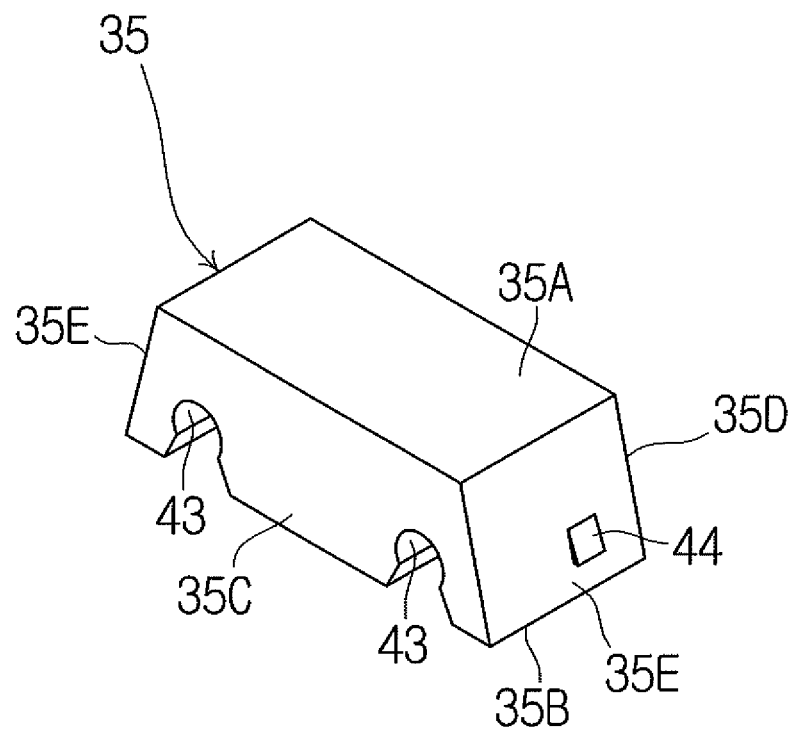
FIG. 32 is a perspective view showing a wire holding body (second modified example)

In contrast, in the second modified example, as shown in FIG. 32, the two side surfaces 35E are inclined in such a manner that the side surfaces 35E approach each other in a direction in which the wire holding body 35 is attached to the terminal holding body 34. According to the above structure, the wire holding body 35 can be easily inserted between the two rear projecting portions 37 of the terminal holding body 34.

Like in the second modified example, when the two side surfaces 35E are inclined, the inner surfaces 37A of the two rear projecting portions 37 shown in FIG. 19 are preferably inclined in such a manner that the inner surfaces 37A approach each other in the direction in which the wire holding body 35 is attached to the terminal holding body 34.

Third Modified Example

A third modified example will be described below with reference to FIG. 33. Differences between the third modified example and the fourth exemplary embodiment will be mainly described, while a repeat of previous descriptions is omitted.

For example, as shown in FIG. 20, in the fourth exemplary embodiment, the two wire holding grooves 43 are formed in the lower surface 35B of the wire holding body 35, and two wires 32 are respectively attached to the two wire holding grooves 43 in the direction indicated by the arrow P.

Figure 33:
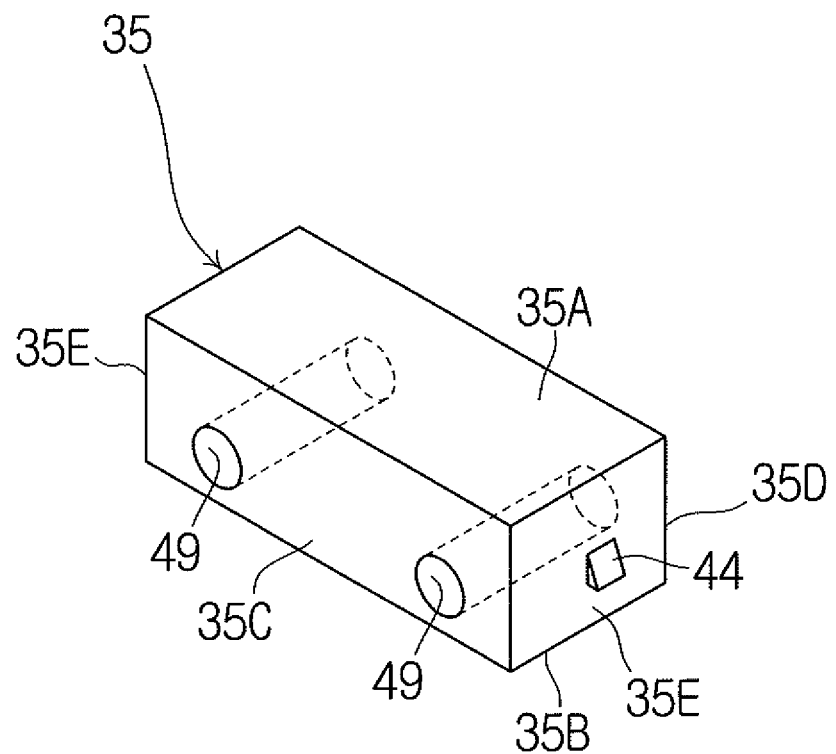
FIG. 33 is a perspective view showing a wire holding body (third modified example)

In contrast, in the third modified example, as shown in FIG. 33, two wire holding holes 49 are formed in the wire holding body 35, instead of forming the two wire holding grooves 43 in the wire holding body 35. Each wire holding hole 49 extends in the front-back direction and is opened at the front surface 35C and the back surface 35D. Also, this structure allows the wire holding body 35 to stably hold the two wires 32.

Fourth Modified Example

A fourth modified example will be described below with reference to FIG. 34. Differences between the fourth modified example and the fourth exemplary embodiment will be mainly described, while a repeat of previous descriptions is omitted.

For example, as shown in FIG. 20, in the fourth exemplary embodiment, the two wire holding grooves 43 are formed in the lower surface 35B of the wire holding body 35, and two wires 32 are respectively attached to the two wire holding grooves 43 in the direction indicated by the arrow P.

Figure 34:
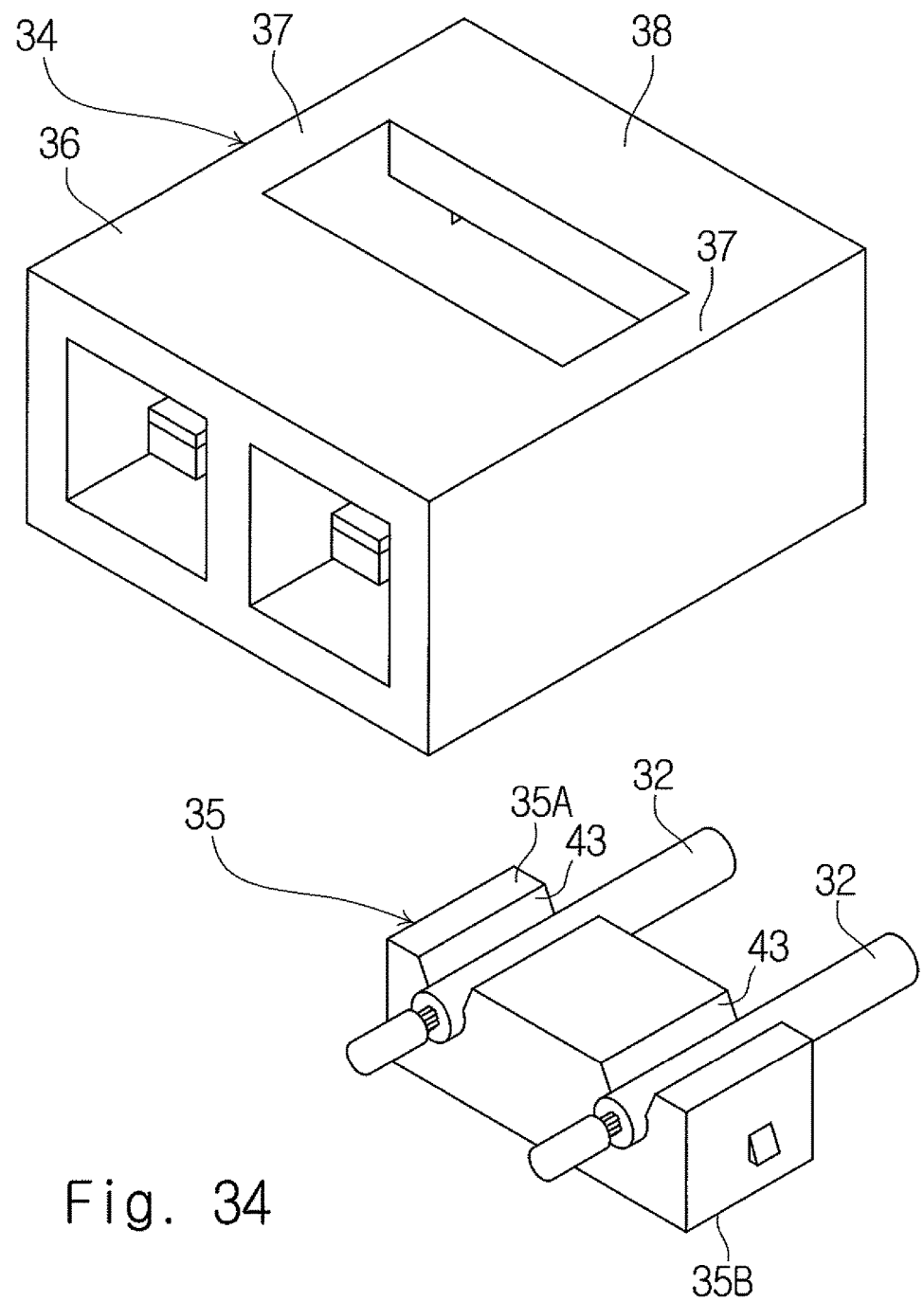
FIG. 34 is an exploded perspective view of a harness (fourth modified example)

In contrast, in the fourth modified example, as shown in FIG. 34, the two wire holding grooves 43 are formed in the upper surface 35A of the wire holding body 35, and two wires 32 are respectively attached to the two wire holding grooves 43. According to the above structure, the two wire holding grooves 43 are closed by the coupling beam 38 of the terminal holding body 34 in the state where the wire holding body 35 is attached to the terminal holding body 34. This structure can effectively prevent each wire 32 from being removed from the corresponding wire holding groove 43.

Fifth Modified Example

A fifth modified example will be described below with reference to FIG. 35. Differences between the fifth modified example and the fourth embodiment will be mainly described, while a repeat of previous descriptions is omitted.

For example, as shown in FIG. 19, in the fourth exemplary embodiment, the fixed portion 33B is held in a cantilever manner by the terminal holding body 34.

Figure 35:
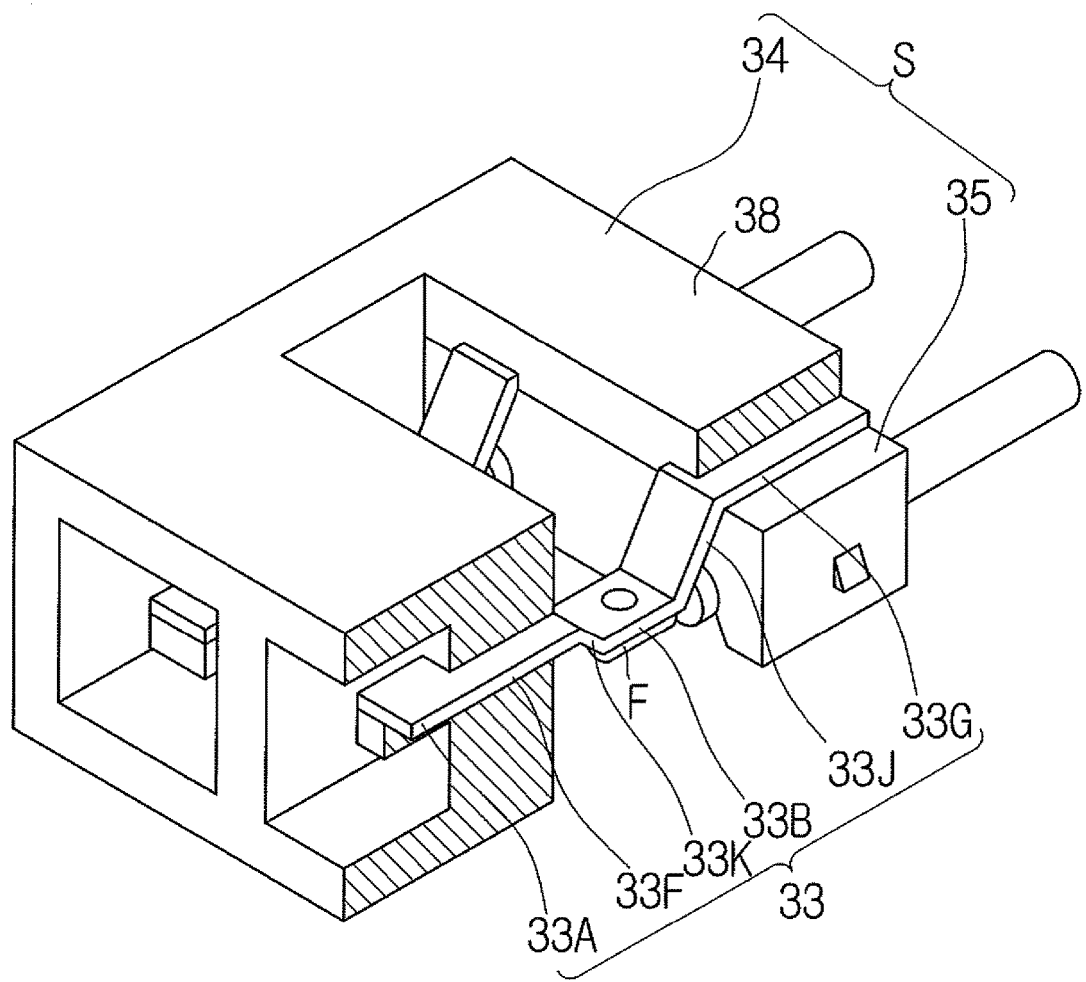
FIG. 35 is a partially cutaway perspective view of a harness (fifth modified example)

In contrast, in the fifth modified example, as shown in FIG. 35, the fixed portion 33B is supported at both ends thereof by the housing S. In other words, in the fifth modified example, each terminal 33 further includes a rear held portion 33G. The rear held portion 33G is formed so as to extend backward from the fixed portion 33B. The fixed portion 33B is located between the embedded portion 33F and the rear held portion 33G. The rear held portion 33G is sandwiched between the coupling beam 38 and the wire holding body 35 vertically, and thus is held by the housing S. Accordingly, the fixed portion 33B is located between the embedded portion 33F, which is held by the terminal holding body 34, and the rear held portion 33G, which is held by the housing S, so that the fixed portion 33B is supported at both ends thereof by the housing S. In other words, the terminal 33 is supported by the housing S (fixing structure body) at two locations that sandwich the fixed portion 33B of the terminal 33 as a portion to be connected and fixed to the conductor 41. According to the above structure, an unintended deformation of the terminal 33 can be prevented.

Note that in the fifth modified example, in order to bring the fixed portion 33B into contact with the brazing filler metal F, the terminal 33 further includes an inclined portion 33J and an inclined portion 33K. The inclined portion 33J couples the fixed portion 33B and the rear held portion 33G together. The inclined portion 33K couples the fixed portion 33B and the embedded portion 33F together. According to the presence of the inclined portion 33J and the inclined portion 33K, the height of the fixed portion 33B can be freely adjusted.

When the laser beam L is irradiated onto the fixed portion 33B of each terminal 33, a support base that supports the brazing filler metal F may be placed below the brazing filler metal F.

Sixth Modified Example

A sixth modified example will be described below with reference to FIG. 36. Differences between the sixth modified example and the fourth embodiment are mainly described, and a repeated explanation is omitted.

Figure 36:
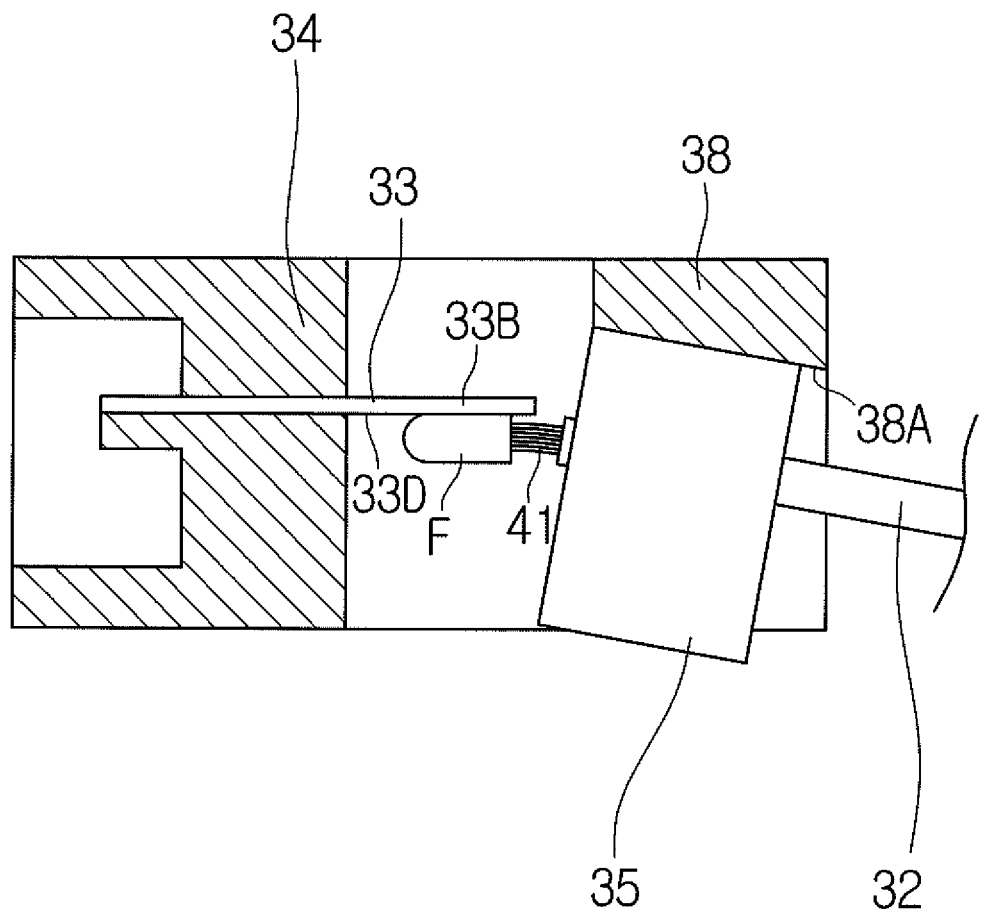
FIG. 36 is a sectional view of a harness (sixth modified example)
Figure 37:
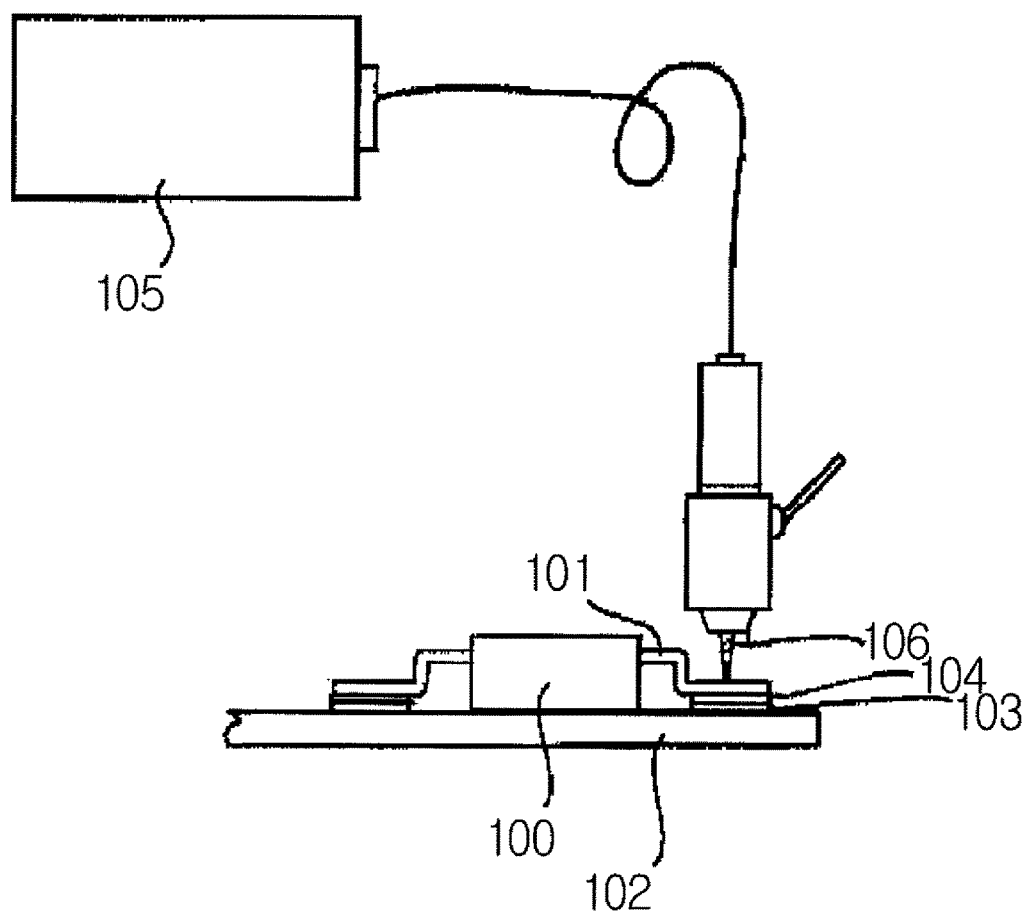
FIG. 37 is a diagram corresponding to FIG. 1 of Japanese Unexamined Patent Application Publication No. 2003-204149.

As shown in FIG. 36, in the sixth modified example, when the wire holding body 35 is mated to the terminal holding body 34, the lower surface 38A, which is a mating surface of the terminal holding body 34 with respect to the wire holding body 35, is inclined with respect to the lower surface 33D in such a manner that the brazing filler metal F is pressed against the lower surface 33D (fixed surface) of the fixed portion 33B of the terminal 33. According to the above structure, even if there is a slight machining error in the terminal holding body 34 or the wire holding body 35, the terminal 33 can be reliably brought into contact with the brazing filler metal F, while the conductor 41 is subjected to a bending deformation, only by mating the wire holding body 35 and the terminal holding body 34 together.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fixing method for fixing a terminal to an object to be fixed with a solder disposed therebetween, the fixing method comprising:
    a first step of disposing the solder on the object to be fixed;
    a second step of bringing the terminal into contact with the solder; and
    a third step of forming a penetrating hole in the terminal by irradiating a laser beam onto the terminal,
    wherein in the third step, the laser beam is irradiated onto the terminal in such a manner that the solder melted by the irradiation of the laser beam passes through the penetrating hole and reaches the vicinity of an upper end of the penetrating hole, and
    wherein in the third step, the laser beam is irradiated onto the terminal while the terminal is pressed against the solder by an external force or a weight of a connector including the terminal.

2. The fixing method according to claim 1, wherein in the third step, the laser beam is irradiated onto the terminal in such a manner that the solder melted by the irradiation of the laser beam passes through the penetrating hole, flows out from the upper end of the penetrating hole, and spreads over a laser irradiation surface of the terminal.

3. The fixing method according to claim 1, wherein the object to be fixed is a conductive pattern formed on a substrate.

4. The fixing method according to claim 3, wherein
    in the first step, the solder is disposed on the conductive pattern by carrying out a reflow process after the conductive pattern is coated with a cream solder.

5. The fixing method according to claim 1, wherein the object to be fixed is a conductor of a wire.

6. The fixing method according to claim 5, wherein
    in the first step, the solder is disposed on the conductor by wetting the conductor with the solder.

7. The fixing method according to claim 5, wherein in the second step, the terminal is brought into contact with the solder by mating a wire holding body with a terminal holding body, the wire holding body holding the wire, the terminal holding body holding the terminal.

8. The fixing method according to claim 5, wherein in the second step, the terminal is brought into contact with the solder, while at least one of the conductor and the terminal is subjected to a bending deformation, by mating a wire holding body with a terminal holding body, the wire holding body holding the wire, the terminal holding body holding the terminal.

9. The fixing method according to claim 1, wherein the terminal is a Cu-based or Au-based metal.

* * * * *